(12) United States Patent
Akella et al.

(10) Patent No.: US 11,509,668 B2
(45) Date of Patent: Nov. 22, 2022

(54) SYSTEMS AND METHODS FOR DEVICE FINGERPRINTING

(71) Applicant: Netskope, Inc., Santa Clara, CA (US)

(72) Inventors: Srinivas Akella, San Jose, CA (US); Shahab Sheikh-Bahaei, Atherton, CA (US)

(73) Assignee: NETSKOPE, INC., Santa Clara, CA (US)

( * ) Notice: Subject to any disclaimer, the term of this patent is extended or adjusted under 35 U.S.C. 154(b) by 261 days.

(21) Appl. No.: 16/809,349

(22) Filed: Mar. 4, 2020

(65) Prior Publication Data

US 2021/0281582 A1    Sep. 9, 2021

(51) Int. Cl.
*H04L 9/40* (2022.01)
*G06N 3/04* (2006.01)
*G06N 3/08* (2006.01)

(52) U.S. Cl.
CPC ........... *H04L 63/1416* (2013.01); *G06N 3/04* (2013.01); *G06N 3/08* (2013.01)

(58) Field of Classification Search
CPC .............. H04L 63/1416; H04L 63/1425; H04L 63/1466; H04L 63/14; H04L 63/102; G06N 3/04; G06N 3/08; G06N 3/02; H04W 8/005; H04W 12/79
USPC .............................................. 726/22–25, 13
See application file for complete search history.

(56) References Cited

U.S. PATENT DOCUMENTS

| 7,290,046 B1* | 10/2007 | Kumar ................ H04L 12/2801 725/111 |
| 8,370,955 B2* | 2/2013 | Proctor, Jr. .......... G06Q 20/385 726/28 |
| 9,374,663 B2* | 6/2016 | Lee ....................... H04W 4/025 |
| 2007/0025245 A1 | 2/2007 | Porras et al. |

(Continued)

OTHER PUBLICATIONS

Marchal et al.; AUDI: Toward Autonomous IoT Device-Type Identification Using Periodic Communication; IEEE (Year: 2019).*

(Continued)

*Primary Examiner* — Kambiz Zand
*Assistant Examiner* — Mahabub S Ahmed
(74) *Attorney, Agent, or Firm* — David R. Stevens; Stevens Law Group

(57) ABSTRACT

Systems and methods to reverse-predict a MAC address associated with a computing device are described. In one embodiment, first temporal communication data associated with the computing device is accessed for a first time interval. The first temporal communication data is converted into a first image. Second temporal communication data associated with the computing device is accessed for a second time interval. The second temporal communication data is converted into a second image. An image ensemble including the first image and the second image is analyzed using a neural network. Each image in the image ensemble is converted from temporal communication data associated with the computing device. The neural network learns a temporal pattern associated with the image ensemble. Current temporal communication data associated with the computing device is accessed and converted into a current image. The current image is compared with the temporal pattern. A MAC address associated with the computing device is reverse-predicted responsive to the comparison.

20 Claims, 16 Drawing Sheets

(56) References Cited

U.S. PATENT DOCUMENTS

| | | | |
|---|---|---|---|
| 2008/0253380 A1* | 10/2008 | Cazares | H04L 63/0876 370/395.53 |
| 2010/0088747 A1* | 4/2010 | Fink | H04L 63/102 726/3 |
| 2010/0299401 A1* | 11/2010 | Lloyd | H04L 12/40117 709/209 |
| 2013/0139263 A1 | 5/2013 | Beyah et al. | |
| 2013/0167203 A1* | 6/2013 | Etchegoyen | H04L 63/0861 726/4 |
| 2013/0242795 A1* | 9/2013 | Heen | H04L 63/1425 370/252 |
| 2014/0283062 A1* | 9/2014 | Kamthe | H04L 63/1425 726/23 |
| 2015/0081382 A1* | 3/2015 | L'Heureux | G06Q 30/0261 705/7.29 |
| 2015/0237038 A1* | 8/2015 | Grajek | G06F 21/64 726/8 |
| 2015/0237049 A1 | 8/2015 | Grajek et al. | |
| 2016/0217022 A1* | 7/2016 | Velipasaoglu | H04L 41/16 |
| 2016/0226892 A1* | 8/2016 | Sen | H04W 12/02 |
| 2017/0041345 A1* | 2/2017 | Mandalia | H04W 12/06 |
| 2017/0150357 A1* | 5/2017 | Waytena, Jr. | H04W 12/069 |
| 2017/0299633 A1* | 10/2017 | Pietrowicz | H04L 43/12 |
| 2018/0077572 A1* | 3/2018 | Trappitt | G06Q 30/0271 |
| 2018/0083994 A1* | 3/2018 | Armstrong | H04L 63/1425 |
| 2018/0145834 A1* | 5/2018 | Dharankar | H04W 12/10 |
| 2019/0043148 A1* | 2/2019 | Vemury | G06K 7/1095 |
| 2019/0172096 A1 | 6/2019 | Tenant de la Tour et al. | |
| 2019/0190920 A1* | 6/2019 | Connell, II | H04W 12/71 |
| 2019/0297102 A1* | 9/2019 | Davis, III | H04L 63/1416 |
| 2019/0356505 A1* | 11/2019 | Madden | H04L 12/2834 |
| 2020/0076799 A1 | 3/2020 | Lackey et al. | |
| 2020/0213352 A1* | 7/2020 | Fainberg | H04L 63/1466 |
| 2020/0344203 A1* | 10/2020 | Mermoud | H04L 61/5014 |
| 2021/0058415 A1 | 2/2021 | Sanzgiri et al. | |
| 2021/0099473 A1* | 4/2021 | Fainberg | H04W 12/12 |
| 2021/0258774 A1* | 8/2021 | Ramsay, III | H04W 12/69 |
| 2021/0271962 A1* | 9/2021 | Abhishek | G06F 17/18 |

OTHER PUBLICATIONS

Shahid, et al.; IoT Devices Recognition Through Network Traffic Analysis; IEEE (Year: 2018).*

Alotaibi et al.; A New MAC Address Spoofing Detection Technique Based on Random Forests; www.mdpi.com/journal/sensors (Year: 2016).*

Aksoy et al.; Automated IoT Device Identification using Network Traffic; ICC 2019—2019 IEEE International Conference on Communications (ICC) (Year: 2019).*

Uluagac et al.; A Passive Technique for Fingerprinting Wireless Devices with Wired-side Observations; IEEE (Year: 2013).*

Sivanathan et al.; Classifying IoT Devices in Smart Environments Using Network Traffic Characteristics; IEEE (Year: 2019).*

Kim et al.; Deriving and measuring DNS-based fingerprints; www.elsevier.com/locate/jisa (Year: 2017).*

Hall; Detection of rogue devices in Wireless Networks; Ph.D. Thesis, Ottawa-Carleton Institute for Computer Science, Carleton University (Year: 2006).*

Vo-Huu et al.; Fingerprinting Wi-Fi Devices Using Software Defined Radios; 2016 ACM. ISBN 978-1-4503-4270-4/16/07. (Year: 2016).*

Bitar, et al.; Wireless Technology Identification Using Deep Convolutional Neural Networks; IEEE (Year: 2017).*

Dong et al.; Your Smart Home Can't Keep a Secret: Towards Automated Fingerprinting of IoT Traffic with Neural Networks; ACM (Year: 2019).*

Aneja et al.; IoT Device Fingerprint using Deep Learning; IEEE (Year: 2018).*

* cited by examiner

SYSTEMS AND METHODS FOR DEVICE FINGERPRINTING

RELATED APPLICATIONS

This application is related to U.S. application Ser. No. 16/809,309 filed Mar. 4, 2020, U.S. application Ser. No. 16/809,364 filed Mar. 4, 2020, and U.S. application Ser. No. 16/809,377 filed Mar. 4, 2020, which are incorporated herein by reference for all purposes.

BACKGROUND

Technical Field

The present disclosure relates to systems and methods that analyze temporal communication data associated with one or more computing devices in a computer network and determine one or more properties associated with the computing devices.

Background Art

Currently, systems and methods used to identify one or more computing devices that are a part of a computer network only analyze Ethernet traffic associated with communication between the computing devices and the network, or one or more RF signals associated with the computing devices. These identification methods result in insufficient identification of the computing devices. This, in turn, results in incorrect profiling of any behaviors of the computing devices, and an inability to set adequate controls to protect the computing devices and the computing network from external nefarious attacks.

SUMMARY

Embodiments continuously classify temporal communication data associated with a computing device by accessing and processing temporal communication data associated with the computing device to create a plurality of (e.g., supervised and/or unsupervised) preprocessing models. The preprocessing models are used to train a neural network which, in turn, derives one or more properties associated with the computing device from the temporal communication data. A device fingerprint is defined from the one or more properties.

Subsequent to defining the device fingerprint, the method accesses additional temporal communication data associated with the computing device. The neural network derives one or more additional properties associated with the computing device from the additional temporal communication data. The one more additional properties are aggregated into the defined fingerprint, refining the defined device fingerprint.

Embodiments of apparatuses configured to continuously classify temporal communication data associated with a computing device can include: a database configured to store temporal communication data associated with the computing device, a processing system configured to process the data to create a plurality of preprocessing models, and a neural network that is trained on preprocessed data generated by the preprocessing models. The neural network derives one or more properties associated with the computing device from the temporal communication data, and defines a device fingerprint from the one or more properties.

The neural network accesses additional temporal communication data, and derives one or more additional properties associated with the computing device from the additional temporal communication data. The neural network aggregates the one or more additional properties into the defined fingerprint, refining the defined device fingerprint.

Embodiments can also reverse-predict a media access control (MAC) address associated with a computing device include accessing first temporal communication data associated with the computing device for a first time interval. The first temporal communication data is converted into a first image. Second temporal communication data associated with the computing device is accessed during a second time interval. The second temporal communication data is converted into a second image.

A neural network can analyze an image ensemble that includes the first image and the second image, where each image in the image ensemble is converted from temporal communication data associated with the computing device. The neural network learns a temporal pattern associated with the image ensemble. Current temporal communication data associated with the computing device is accessed and converted into a current image, and this current image is compared with the temporal pattern to reverse-predict a MAC address associated with the computing device.

Embodiments of apparatuses configured to reverse-predict a MAC address associated with a computing device can include: a database configured to store temporal communication data for a plurality of time intervals associated with the computing device, and a processing system communicatively coupled to the database. The processing system accesses first temporal communication data associated with the computing device for a first time interval, and converts the first temporal communication data into a first image. The processing system accesses second temporal communication data associated with the computing device for a second time interval, and converts the second temporal communication data into a second image.

A neural network associated with the processing system analyzes an image ensemble that includes the first image and the second image. Each image in the image ensemble is converted from temporal communication data associated with the computing device. The neural network learns a temporal pattern associated with the image ensemble.

The processing system accesses current temporal communication data associated with the computing device from the database and converts the current temporal communication data into a current image. The neural network compares the current image with the temporal pattern and reverse-predicts a MAC address associated with the computing device.

Embodiments can also generate a device composite fingerprint associated with a computing device. Communication data associated with the computing device is accessed. The communication data includes device identification data, device group data, and device operational data. The device identification data is used to generate a device identity fingerprint associated with the computing device, the device group data is used to generate a device group fingerprint associated with the computing device, and the device operational data is used to generate a device operational fingerprint associated with the computing device. These three fingerprints are combined together to generate a device composite fingerprint associated with the computing device.

Embodiments of apparatuses configured to generate a device composite fingerprint associated with a computing device include a network gateway configured to receive communication data associated with the computing device, and a processing system communicatively coupled to the network gateway. The processing system receives the communication data from the network gateway. The communication data can include device identification data, device group data, and device operational data. The processing system generates a device identity fingerprint associated with the computing device using the device identification data, a device group fingerprint associated with the computing device using the device group data, and a device operational fingerprint associated with the computing device using the device operational data. The processing system combines the device identity fingerprint, the device group fingerprint, and the device operational fingerprint to generate a device composite fingerprint associated with the computing device.

Embodiments configured to generate a hyper context associated with a computing device can access communication data associated with the computing device. One or more features associated with the computing device are extracted from the communication data. The following properties of the computing device may be detected:
A type of the computing device,
An operating system associated with the computing device,
A control associated with the computing device,
A functionality of the computing device, and
An ownership of the computing device.

A hyper context associated with the computing device is defined, where the hyper context consists of a type context, a category context, an operating system context, an ownership context, and a control context.

Embodiments of apparatuses configured to generate a hyper context associated with a computing device can include: a database configured to store communication data associated with the computing device, and a processing system configured to process the communication data. The processing system extracts one or more features associated with the computing device from the communication data, and can detect:
A type of the computing device,
An operating system associated with the computing device,
A control associated with the computing device,
A functionality of the computing device, and
An ownership of the computing device.

The processing system defines a hyper context associated with the computing device, where the hyper context consists of a type context, a category context, an operating system context, an ownership context, and a control context.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

Figure 1:
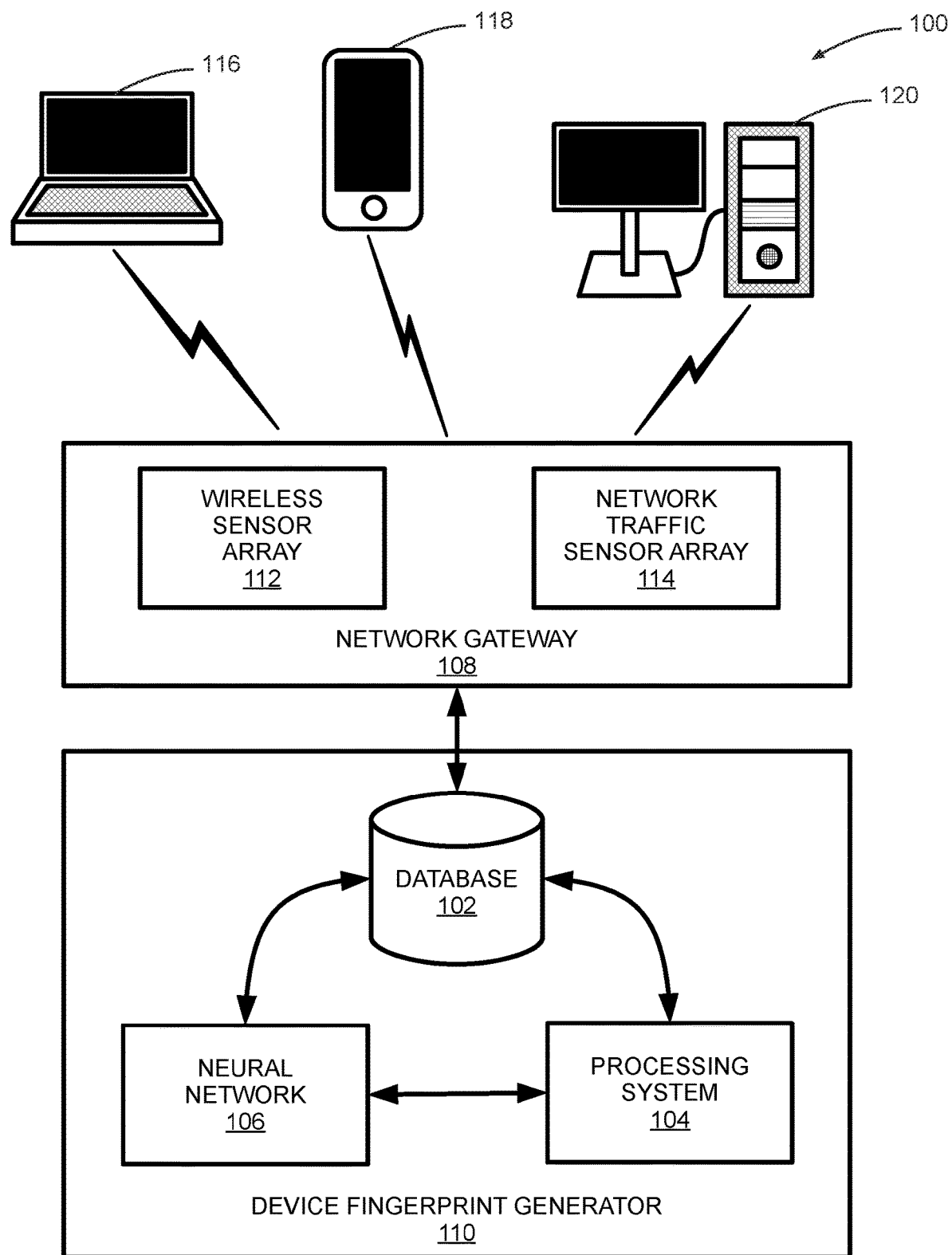
FIG. 1 is a block diagram depicting an embodiment of a temporal data classification system.

In the following description, reference is made to the accompanying drawings that form a part thereof, and in which is shown by way of illustration specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The following detailed description is, therefore, not to be taken in a limiting sense.

Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, databases, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Embodiments in accordance with the present disclosure may be embodied as an apparatus, method, or computer program product. Accordingly, the present disclosure may take the form of an entirely hardware-comprised embodiment, an entirely software-comprised embodiment (including firmware, resident software, micro-code, etc.), or an embodiment combining software and hardware aspects that may all generally be referred to herein as a "circuit," "module," or "system." Furthermore, embodiments of the present disclosure may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, a magnetic storage device, and any other storage medium now known or hereafter discovered. Computer program code for carrying out operations of the present disclosure may be written in any combination of one or more programming languages. Such code may be compiled from source code to computer-readable assembly language or machine code suitable for the device or computer on which the code will be executed.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

The flow diagrams and block diagrams in the attached figures illustrate the architecture, functionality, and operation of possible implementations of systems, methods, and computer program products according to various embodiments of the present disclosure. In this regard, each block in the flow diagrams or block diagrams may represent a module, segment, or portion of code, which includes one or more executable instructions for implementing the specified logical function(s). It will also be noted that each block of the block diagrams and/or flow diagrams, and combinations of blocks in the block diagrams and/or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow diagram and/or block diagram block or blocks.

There exists a need for a comprehensive method to profile (i.e., fingerprint) a computing device that is a part of a computer network, and determine properties of the computing device that will minimize any ambiguities associated with uniquely identifying the computing device. The systems and methods described herein relate to identifying devices connected to a network. In some embodiments, network communication data, both wired and wireless, is analyzed to determine a unique device identification for each computing device associated with the network. This device identification is also known as a fingerprint, and is used to identify the computing device across time and space to understand the operational usage of that computing device.

FIG. 1 is a block diagram depicting an embodiment of a temporal data classification system 100. In some embodiments, temporal data classification system 100 includes a network gateway 108. Network gateway 108 includes a wireless sensor array 112 and a network traffic sensor array 114. Details about wireless sensor array 112 and network traffic sensor array 114 are provided herein.

In some embodiments, a computing device 116, a computing device 118, and a computing device 120 are communicatively coupled to network gateway 108. Computing device 116 through computing device 120 (and other computing devices that may be communicatively coupled to network gateway 108 but not shown in FIG. 1) may be any combination of desktop computers, laptop computers, mobile devices such as tablets and cellular phones, internet-of-things (IoT) devices, or any other computing devices.

In embodiments, network gateway 108 is communicatively coupled with a device fingerprint generator 110. Specifically, network gateway 108 is communicatively coupled with a database 102 that is included in device fingerprint generator 110. In some embodiments, device fingerprint generator 110 includes a neural network 106 and a processing system 104. Each of database 102, processing system 104, and neural network 106 are communicatively coupled with each other, as shown in FIG. 1. In some embodiments, neural network 106 is a convolutional neural network. In other embodiments, neural network 108 is a recurrent neural network, a temporal convolutional network, or a similar learning algorithm.

In some embodiments, computing device 116 through computing device 120 are a part of a computer network and communicate over the network using any combination of wired or wireless communication protocols. For example, a wired communication protocol such as Ethernet may be used by any of computing device 116 through computing device 120. Examples of wireless communication protocols include WiFi, Bluetooth, Bluetooth Low Energy (BLE), Zigbee, Long-Term Evolution (LTE), Lorawan, zwave, and so on. Network gateway 108 receives network communication data from each of computing device 116 through computing device 120, using wireless sensor array 112 and network traffic sensor array 114. In some embodiments, wireless sensor array 112 is configured to receive any combination of wireless communication signals that include the wireless communication signals described above; network traffic sensor array 114 is configured to receive network communication signals such as Ethernet data.

In some embodiments, communication data associated with computing device 116 through computing device 120 is collectively received by network gateway 108 and transmitted to database 102. Database 102 is configured to store temporal communication data associated with computing device 116 through computing device 120. Temporal communication data associated with a computing device (such as computing device 116) is defined as historical communication data over a past period of time (e.g., two weeks, six months, or some other past time interval), and also communication data for a present time interval. In other words, database 102 receives and stores communication data received from computing device 116 through computing device 120 via network gateway 108 over a period of time that includes a past timeframe and a present timeframe.

In some embodiments, processing system 104 accesses temporal communication data associated with a computing device (such as computing device 116) from database 102, and processes the temporal communication data to create a plurality of preprocessing models. In some embodiments, these preprocessing models may be any combination of unsupervised learning models and supervised learning models. These preprocessing models are used to train neural network 106. Neural network 106 derives one or more properties associated with the computing device from the temporal communication data, and defines a device fingerprint from the one or more properties. The device fingerprint associated with the computing device is a device identity that allows device fingerprint generator 110 to substantially uniquely identify the computing device.

In some embodiments, subsequent to defining the device fingerprint, neural network 106 accesses additional temporal communication data associated with the computing device, and derives one or more additional properties associated with the computing device from the additional temporal communication data. Neural network 106 aggregates the one or more additional properties into the defined device fingerprint, refining the defined device fingerprint. In some embodiments, all data associated with a device fingerprint is stored in database 102.

Figure 2:
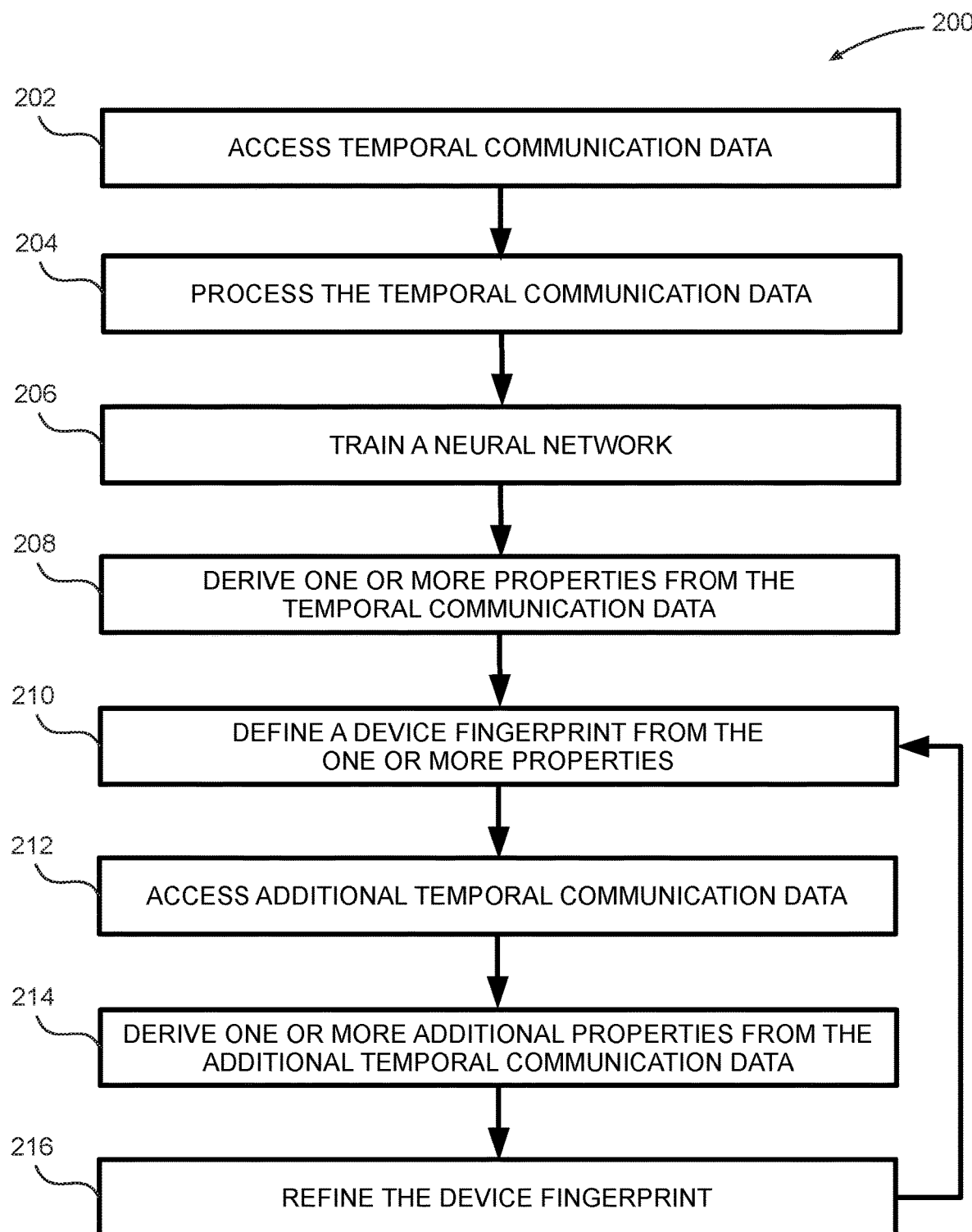
FIG. 2 is a flow diagram depicting an embodiment of a method to continuously classify temporal communication data associated with a computing device.

FIG. 2 is a flow diagram depicting an embodiment of a method 200 to continuously classify temporal communication data associated with a computing device. At 202, the method accesses temporal communication data associated with a computing device. In some embodiments, the temporal communication data is associated with any of computing device 116 through computing device 120, and the temporal communication data is stored in database 102. Next, at 204, the method processes the temporal communication data to create a plurality of preprocessing models. In some embodiments, these preprocessing models may be any combination of unsupervised learning models and supervised learning models. At 206, the method trains a neural network (such as neural network 106) using preprocessed data generated by the preprocessing models. In some embodiments, the preprocessed data is a matrix of properties associated with the computing device, as described herein. At 208, the neural network derives one or more additional properties associated with the computing device from the temporal communication data, and at 210, the method defines a device fingerprint from the one or more properties. The device fingerprint associated with the computing device is a device identity that allows device fingerprint generator 110 to substantially uniquely identify the computing device.

At 212, the method accesses additional temporal communication data associated with the computing device. In some embodiments, the additional temporal communication data is stored in database 102. At 214, the neural network derives one or more additional properties associated with the computing device from the additional temporal communication data. Finally, at 216, the method refines the device fingerprint by aggregating the one or more additional properties into the defined device fingerprint.

In some embodiments, after completing step 216, the method returns back to 210, indicating that the associated algorithm performs a continuous refinement of the device fingerprint as new temporal communication data associated with the computing device continues to be stored in the database over time.

Temporal data classification system 100 essentially adopts a passive/active fingerprinting approach that combines the data from radio and network across all spectrum/ protocols supported by each of computing device 116 through computing device 120. These fingerprinting operations are carried out across time (i.e., temporal communication data), and space (e.g., determining a micro location of a computing device). Temporal communication data points are collected for each of computing device 116 device through computing device 120 to determine one or more parameters associated with each of computing device 116 through computing device 120, such as:

Radio interface information for each interface supported by a computing device.
Operating system, type and classification of the computing device.
Functionality of computing device and the services/apps supported by the computing device.
Micro location and mobility of the computing device.
Ownership and control of the computing device.
Protocol and data characteristics of the computing device.

The developed fingerprint (i.e., the defined device fingerprint) can then be used to uniquely identify the computing device across time and space and to understand an operational usage of that computing device. These can then be used to control access to the computing device and understand risk, threat to and from the device.

Figure 3:
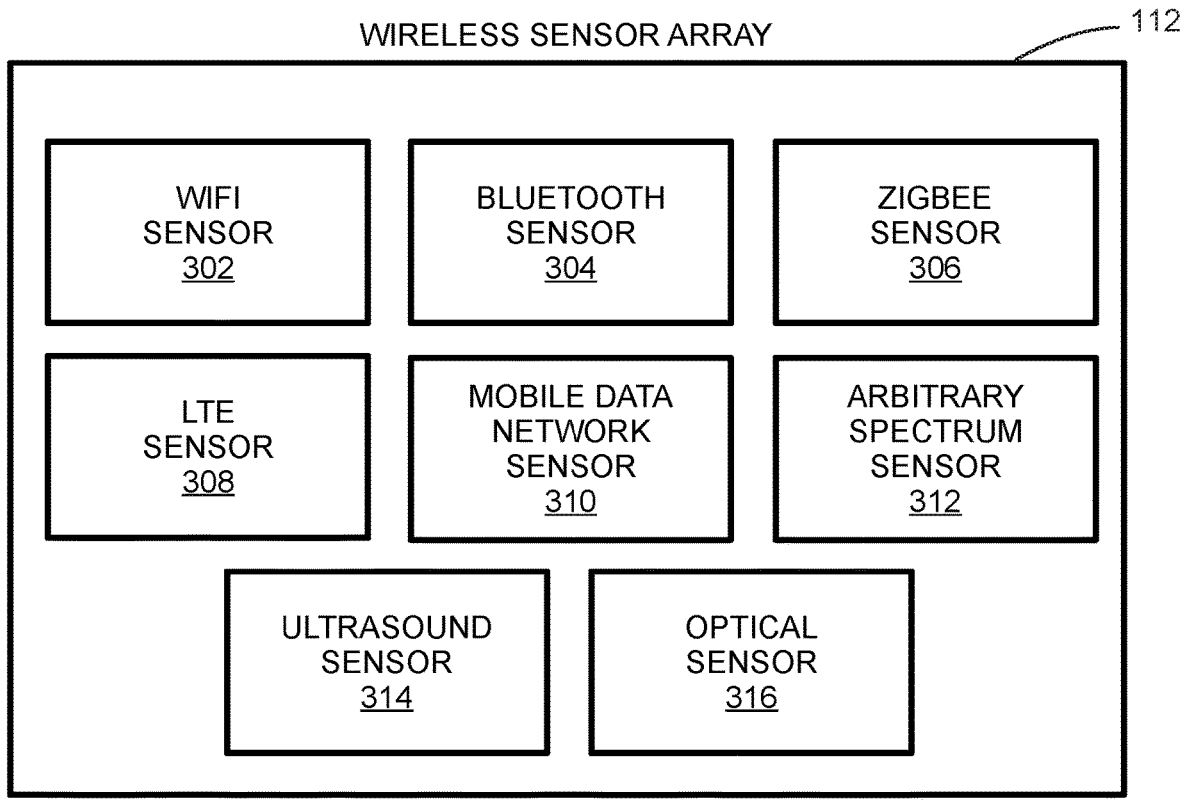
FIG. 3 is a block diagram depicting an embodiment of a wireless sensor array.

FIG. 3 is a block diagram depicting an embodiment of a wireless sensor array 112. Wireless sensor array 112 is configured to scan a physical area in a vicinity of a computer network associated with computing device 116 through computing device 120 to determine any existing RF signals in an RF spectrum associated with the area and non-RF wireless signals associated with the area, and detect and receive any data communication packets associated with the RF signals and the non-RF wireless signals. Essentially, wireless sensor array 112 scans the RF spectrum to determine any existing RF communication signals being used by computing device 116 through computing device 120. Some embodiments of wireless sensor array 112 are able to detect non-RF wireless communication signals used by computing device 116 through computing device 120.

In some embodiments, wireless sensor array 112 includes a WiFi sensor 302 that detects and receives any WiFi communication packets being used for communication by computing device 116 through computing device 120 over the associated communication network. In some embodiments, WiFi sensor 302 is a WiFi packet sniffer. Some embodiments of wireless sensor array 112 include a Bluetooth sensor 304 that detects and receives any Bluetooth communication packets being used for communication by computing device 116 through computing device 120 via one or more peer-to-peer Bluetooth communication links. In some embodiments, Bluetooth sensor 304 is a Bluetooth packet sniffer.

In some embodiments, wireless sensor array 112 includes a ZigBee sensor 306 that detects and receives any ZigBee communication packets being used for communication by computing device 116 through computing device 120 via a ZigBee communication link. In some embodiments, ZigBee sensor 306 is a ZigBee packet sniffer. Some embodiments of wireless sensor array 112 include an LTE sensor 308 that detects long term evolution (LTE) signals being used for communication by computing device 116 through computing device 120. A mobile data network sensor 310 included in some embodiments of wireless sensor array 112 detects communication by computing device 116 through computing device 120 via any other mobile data communication technique such as General Packet Radio Service (GPRS), 3G, 3G+4G, 4G+5G, Global System for Mobile Communications (GSM), Universal Mobile Telecommunications Service (UMTS), and so on. In some embodiments, wireless sensor array 112 includes an arbitrary spectrum sensor 312 that detects and receives RF communication data associated with any arbitrary RF communication protocol used by computing device 116 through computing device 120.

In addition to sensors to detect RF communication signals, wireless sensor array 112 includes components that are capable of detecting non-RF wireless signals such as ultrasound communication signals and optical communication signals. Specifically, an ultrasound sensor 314 included in some embodiments of wireless sensor array 112 is configured to detect communication data associated with any ultrasonic (ultrasound) communication links used by computing device 116 through computing device 120. In some embodiments, wireless sensor array 112 includes an optical sensor 316 that is configured to detect communication data associated with any wireless optical data links used by computing device 116 through computing device 120.

Figure 4:
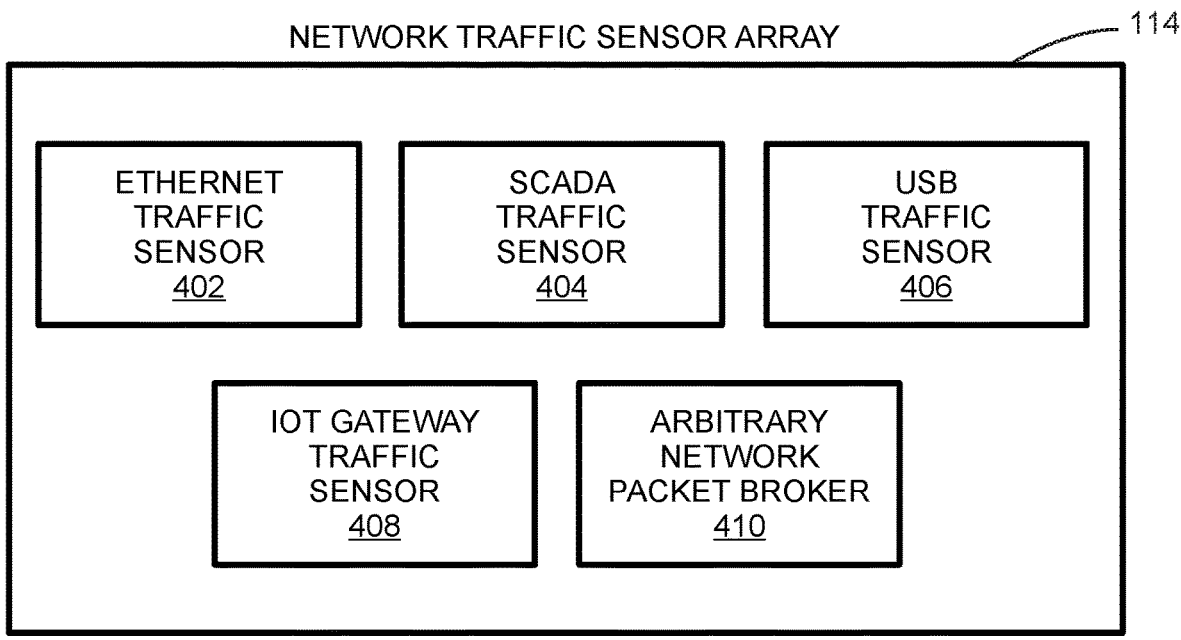
FIG. 4 is a block diagram depicting an embodiment of a network traffic sensor array.

FIG. 4 is a block diagram depicting an embodiment of a network traffic sensor array 114 that is configured to detect any network traffic-related communication data associated with computing device 116 through computing device 120. In some embodiments, network traffic sensor array 114 includes an Ethernet traffic sensor 402 that detects, receives and processes Ethernet traffic communication data associated with computing device 116 through computing device 120. A SCADA traffic sensor 404 included in some embodiments of network traffic sensor array 114 detects, receives and processes SCADA communication data associated with computing device 116 through computing device 120. Some embodiments of network traffic sensor array 114 include a USB traffic sensor 406 that detects, receives and processes USB communication data associated with computing device 116 through computing device 120.

In some embodiments, network traffic sensor array 114 includes an IoT gateway traffic sensor 408. IoT gateway traffic sensor 408 detects, receives, and processes communication data associated with Internet-of-Things (IoT) devices. Some embodiments of network traffic sensor array 114 include an arbitrary network packet broker 410 that detects, receives and processes arbitrary network packets received by network traffic sensor array 114.

In some embodiments, temporal data classification system 100 collects data for each computing device associated with temporal data classification system 100 (e.g., computing device 116 through computing device 120). This data can be collected by sensors that are both in-band and out of band, and is used to generate a device fingerprint for each computing device. In some embodiments, this process may involve the following steps:

1. Using radio sensors for each spectrum and protocol type (e.g., Bluetooth, Bluetooth Low Energy, WiFi, LTE, ZigBee, and so on), collect time domain and frequency domain information to generate a radio signature and profile for each computing device. RF data points from radio frequency signals include one or more of frequency and bandwidth, spectral signature, duty, pulse signature, frequency offset, timing signature, and sweep analyzer data.

2. Using radio sensors and protocol decoders for each spectrum and protocol type physical layer, layer 1 and layer 2 information for each computing device is obtained, and this information is used to generate an interface signature profile for the computing device. Other information that can be extracted for each computing device includes interface identifiers such as media access control (MAC), international mobile subscriber identity (IMSI), electronic serial number (ESN), and so on, signal strength information, information elements and other layer 1 and 2 details in the data that are specific to an associated communication protocol.

3. For each spectrum protocol, where available, when the corresponding computing device is transmitting or receiving data communication packets, all communication or network traffic data is collected. This traffic data is not limited to just Ethernet traffic but any spectrum data that can be collected is collected to be analyzed.

The information collected above from RF, interface-level, protocol-level and data traffic is learned by supervised and unsupervised machine learning algorithms and rule sets to reveal patterns embedded in these measurements (i.e., in the collected information). These machine learning algorithms and rule sets generate models and signatures for each device to get the following intermediate information for each computing device:

1. An operating system information, a type of the computing device and a classification of the computing device. Ex: type: Apple tablet, classification: low power computing, OS: iOS 10.

2. A functionality of the computing device, and services and applications running on the computing device. Ex: Function: Audio/video conferencing, Apps: Zoom, teem.

3. A micro location of the device. This gives insight into mobility of the computing device in a campus, its current location, most frequently-used paths of movement, and whether the computing device travels outside the campus.

4. Ownership and control of the computing device. Whether the computing device is owned by corporate, employee, visitor, or transient, or whether the computing device controlled by a user or the computing device is automated (e.g., a smart phone versus a smart TV).

5. Behavior and rules-based analysis of all data transmissions across all protocols and spectra to and from the computing device.

All the collected data and the intermediate insights (i.e., intermediate information) are then used to develop a device identity fingerprint, a device group fingerprint and device operational fingerprint using temporal convolutional neural network-based algorithms and rule sets for each computing device. These fingerprints enable an accurate recognition of the computing device, group computing devices of same kind together, and classify normal operation and functions for each computing device. The generated fingerprints are maintained as follows:

1. Each of the above fingerprints are stored in a database such as database 102.

2. The fingerprints are used then to develop device operational profiles for each computing device.

3. The fingerprints are used to identify new computing devices that appear on the network to see if they fall into any established classification category.

4. Identify anomalous behavior in the computing devices whose fingerprints have been collected.

5. Offer insights about any risks, threats associated, and best practices to counter the risks and threats.

6. Generate labels based on all collected information, intermediate insights and final fingerprints, and expose these labels to an application layer.

7. These labels can then be used for policies by users to control access to and from the computing devices.

The operational features described above can also be used in the other systems and methods described herein.

In some embodiments, developing a device fingerprint for a computing device includes collection of data such as RF data, demodulation data, frame data, and other kinds of temporal communication data associated with the computing device. Other computing device communication parameters that are collected or extracted from raw temporal communication data include RF signal strength, spectrum analysis, MAC address, one or more frames, transmission rate, medium access frame size, inter packet arrival, and so on. The device fingerprint development technique also analyzes the application layer to extract one or more functionalities associated with a computing device, location mobility, one or more logical parameters, ownership and control. All these parameters are combined to generate a device fingerprint associated with a computing device.

A device fingerprint uniquely identifies a computing device across time and space, and is independent of a MAC address or an IP address associated with the computing device. In some embodiments, machine learning algorithms are used to generate this identification, then a MAC address associated with the computing device is reverse-predicted, as described herein. If this reverse-prediction matches a MAC address extracted from network traffic associated with the computing device as described above, the device is considered to be identical to the initial estimate. Otherwise, one or more flags can be set to alert a system administrator of this discrepancy. This assists a system administrator in identifying hostile computing devices on the network.

Figure 5:
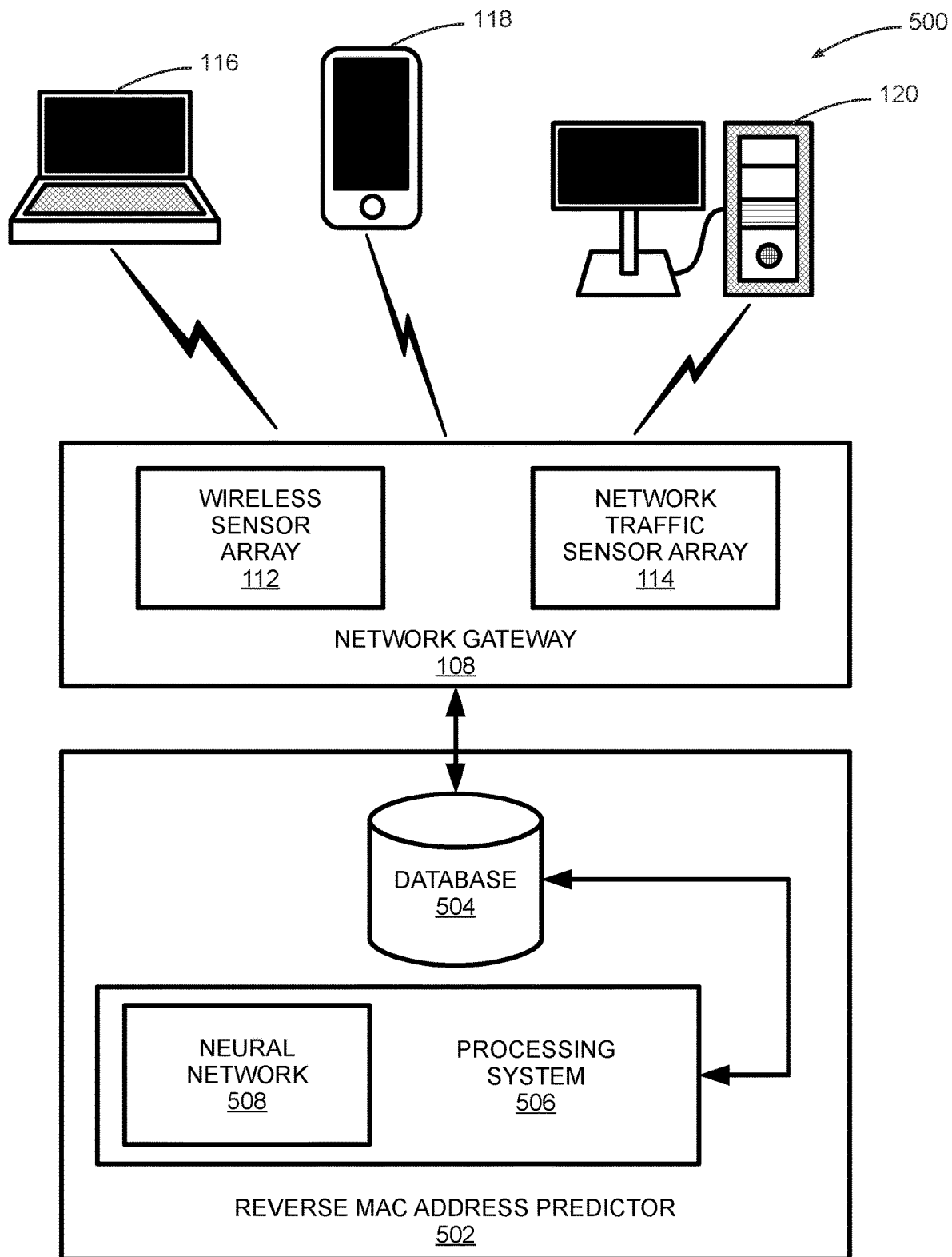
FIG. 5 is a block diagram depicting an embodiment of a reverse MAC address prediction system.

FIG. 5 is a block diagram depicting an embodiment of a reverse MAC address prediction system 500. In some embodiments, reverse MAC address prediction system 500 includes computing device 116, computing device 118, and computing device 120 that function as in temporal data classification system 100. MAC address prediction system 500 also includes network gateway 108, which further includes wireless sensor array 112 and network traffic sensor array 114.

In some embodiments, reverse MAC address prediction system 500 includes a reverse MAC address predictor 502. Reverse MAC address predictor includes a database 504 that is communicatively coupled to network gateway 108. Database 504 is configured to receive and store temporal communication data associated with computing device 116 through computing device 120, via network gateway 108. In some embodiments, database 504 receives the temporal communication data via a combination of wireless sensory array 112 and network traffic sensor array 114.

In some embodiments, database 504 is communicatively coupled to a processing system 506 that includes a neural network 508. In some embodiments, neural network 508 is a convolutional neural network. In other embodiments, neural network 508 is a recurrent neural network. In still other embodiments, neural network 508 is a temporal convolutional network, or some other neural network realization. In embodiments, processing system 506 accesses temporal communication data stored in database 504. This temporal communication data is associated with a computing device such as computing device 116, computing device 118, or computing device 120. Processing system 506 together with neural network 508 process the temporal communication data to reverse-predict a MAC address associated with the computing device, as described herein.

Figure 6A:
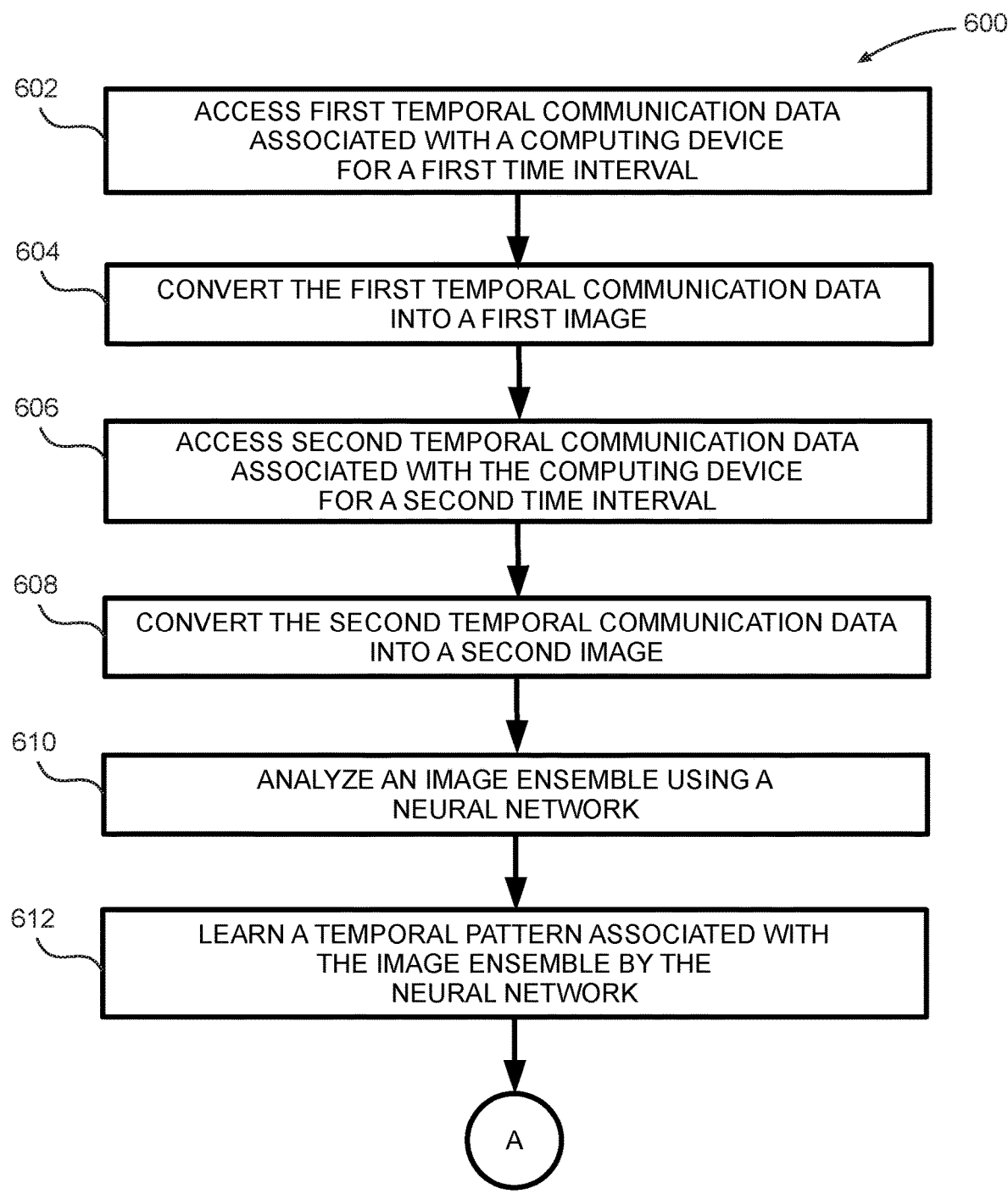
FIGS. 6A and 6B are flow diagrams depicting an embodiment of a method to reverse-predict a MAC address associated with a computing device.

FIG. 6A is a flow diagram depicting an embodiment of a method 600 to reverse-predict a MAC address associated with a computing device. At 602, first temporal communication data associated with a computing device is accessed for a first time interval. In some embodiments, this access is performed by processing system 506, and the temporal communication data and any subsequent temporal communication data are accessed from database 504. 604, the first temporal communication data is converted into a first image. In some embodiments, this conversion and any subsequent conversions are performed by processing system 506. Details about how temporal communication data is converted into an image are provided herein. Next, at 606, second temporal communication data associated with the computing device is accessed for a second time interval. At 608, the second temporal communication data is converted into a second image. In some embodiments, the first time interval and the second time interval represent different points in time where the computing device communicates over the network using one or more of the communication protocols described above. Each of the first temporal communication data and second temporal communication data represents communication data associated with the computing device at different points in time (i.e., during the first time interval and during the second time interval respectively).

At 610, an image ensemble that includes the first image and the second image is analyzed by a neural network (such as neural network 508). In some embodiments, each image in the image ensemble is converted from multiple sets of temporal communication data associated with the computing device. At 612, the neural network learns a temporal pattern associated with the image ensemble. The method then goes to A, with a continued description provided below.

Figure 6B:
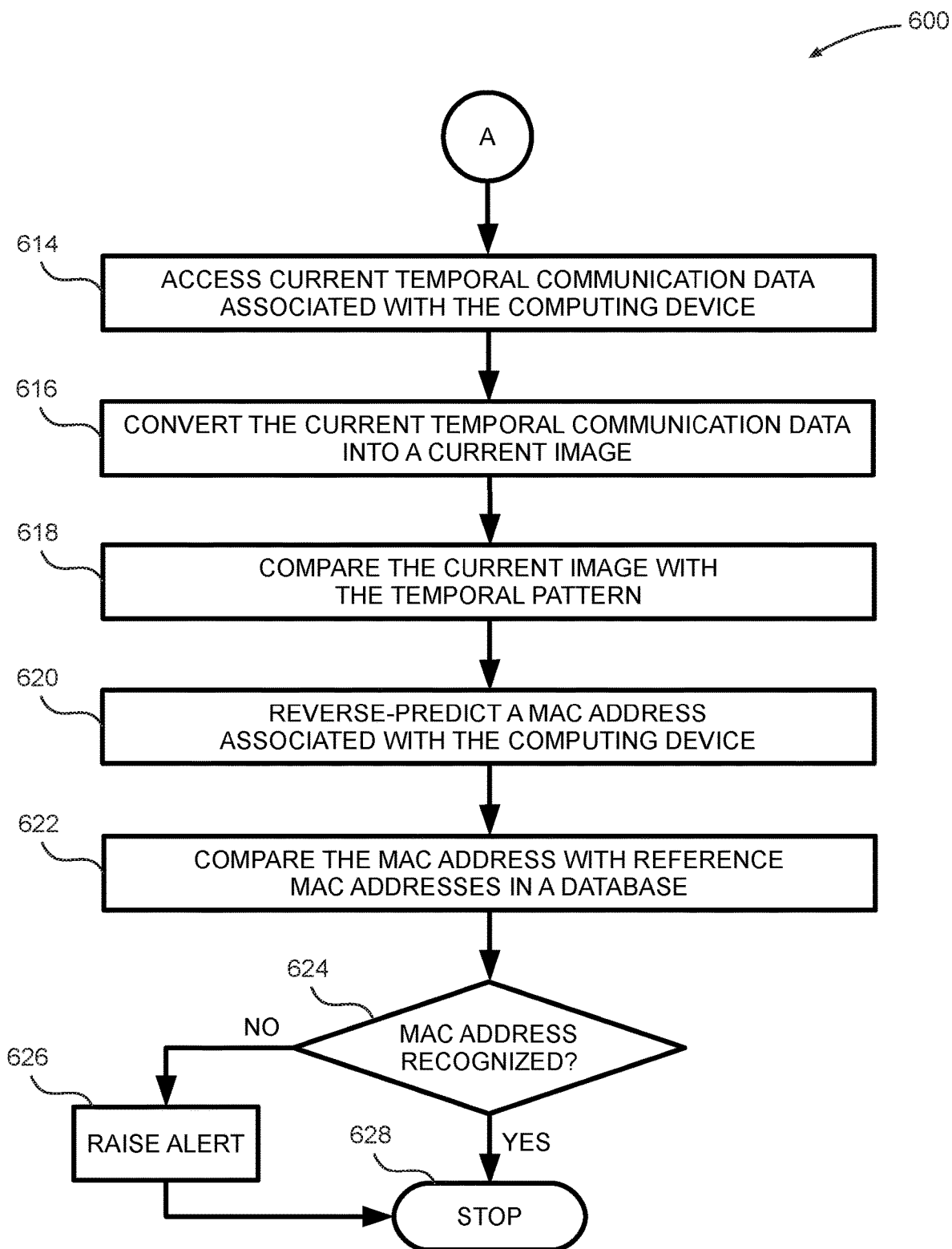

FIG. 6B is a continued description of method 600 from FIG. 6A. At 614, current temporal communication data associated with the computing device is accessed, where the term "current" is used to denote a point in time that is substantially real-time, or a current (i.e., a present) time interval. In this respect, first temporal communication data, second temporal communication data, and all other communication data associated with the image ensemble comprise historical data when compared to the current time interval. Next, at 616, the current temporal communication data is converted into a current image. At 618, the current temporal communication data is compared to the temporal pattern. In some embodiments, this comparison is performed by neural network 508. At 620, the method reverse-predicts a MAC address associated with the computing device. In some embodiments, this reverse-prediction is performed by neural network 508, and is independent of directly reading a MAC address associated with a computing device.

At 622, the MAC address is compared with one or more reference MAC addresses in a database such as database 504. At 624, the method checks to determine whether the MAC address is recognized, or matches a reference MAC address in the database. If the MAC address recognized, then the method terminates at 628. On the other hand, if at 624, the MAC address is not recognized, then the method raises an alert at 626, after which the method terminates at 628.

A high-level algorithm that uses MAC address prediction to generate alerts is as follows:

1. Train a deep neural network model to predict MAC address from network traffic and RF patterns using historical data (e.g., up to yesterday)

2. Use the trained model to predict the top n MAC addresses based on today's (i.e., current) network traffic and RF data 3. If the apparent MAC address is not among the predicted top n predicted MAC addresses: raise anomaly alert 4. goto step 1

Figure 7:
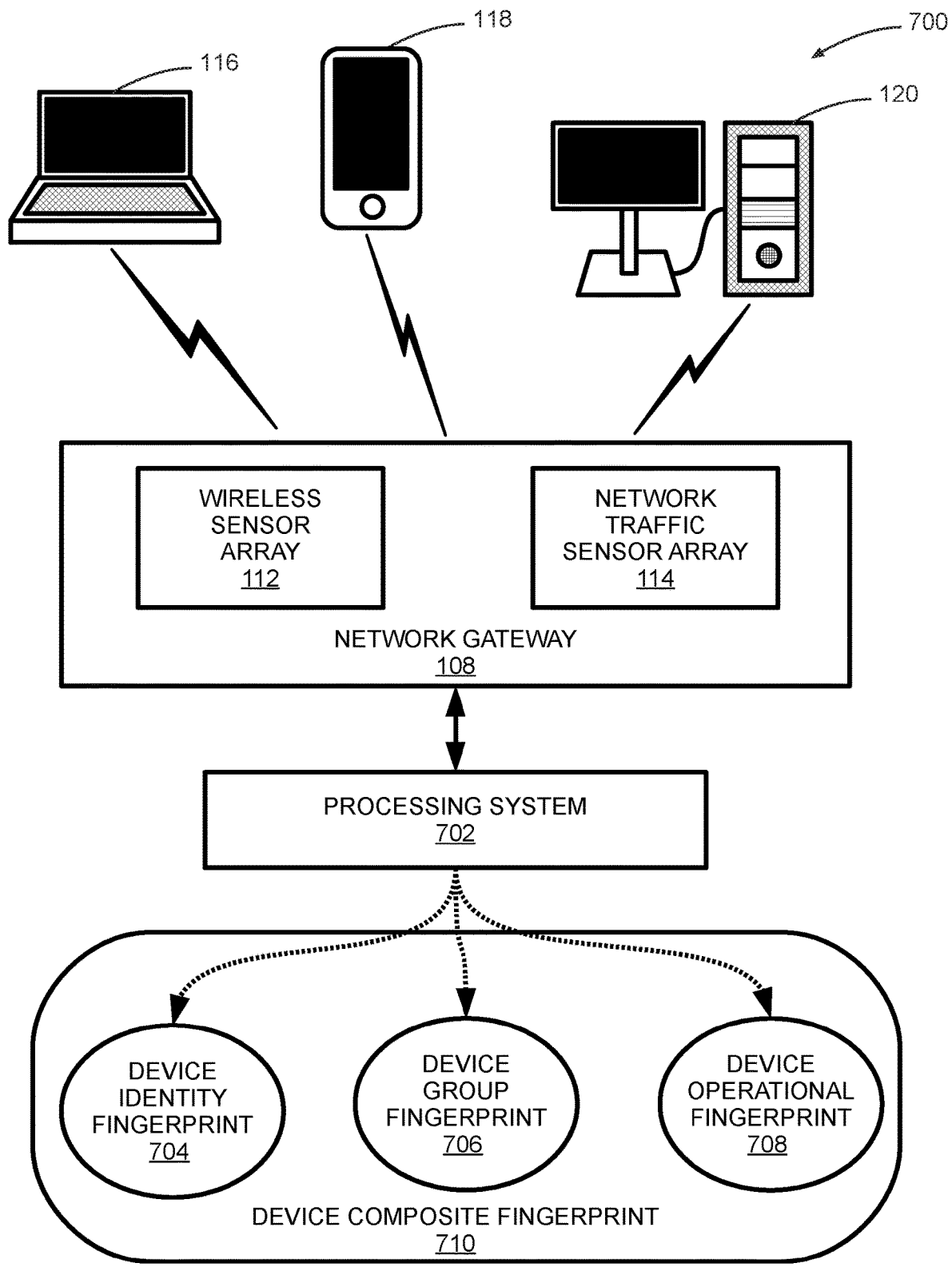
FIG. 7 is a block diagram depicting an embodiment of a device composite fingerprint generation system.

FIG. 7 is a block diagram depicting an embodiment of a device composite fingerprint generation system 700. In some embodiments, device composite fingerprint generation system 700 includes computing device 116, computing device 118, and computing device 120 that function as in temporal data classification system 100. Device composite fingerprint generation system 700 also includes network gateway 108, which further includes wireless sensor array 112 and network traffic sensor array 114.

In some embodiments, device composite fingerprint generation system 700 includes a processing system 702 communicatively coupled to network gateway 108. Processing system 702 receives communication data associated with computing device 116 through computing device 120 via network gateway 108. In some embodiments, this communication data is received via a combination of wireless sensor array 112 and network traffic sensor array 114.

In some embodiments, the communication data received by processing system 702 is associated with a computing device, and includes device identification data, device group data, and device operational data. Device identification data is data that can be used to uniquely identify a computing device, such as an IMSI, an ESN, and so on. Device group data is associated with a logical grouping of the computing device, where the computing device is associated with one or more relevant groups that are associated with different functionalities of the computing device. Such a grouping could be based on one or more automatically-detected hyper context tags such as computer, mobile phone, audio/video conferencing, or Windows; or alternatively, a group could be based on custom-defined criteria such as finance department Windows machines, developer machines, and so on. Once a group is defined, device composite fingerprint generation system 700 learns a normal behavior associated with the group as a whole, to create a group identity for that group. Device operational data includes data associated with a situation in which a computing device exists, and how the computing device is normally operated. For example, device composite fingerprint generation system 700 might learn that a certain smart TV normally uses 6-10 open connections on average; however, if this number of connections drastically deviates from this average behavior, an alert is raised.

In some embodiments, processing system 702 is configured to use the device identification data, the device group data, and the device operational data to generate a device identity fingerprint 704, a device group fingerprint 706, and a device operational fingerprint 708 respectively. Each of device identity fingerprint 704, device group fingerprint 706, and device operational fingerprint 708 captures features that are unique to the associated computing device. In particular embodiments, processing system 702 combines device identity fingerprint 704, device group fingerprint 706, and device operational fingerprint 708 to generate a device composite fingerprint 710. In some embodiments, a trained neural network contains device identity fingerprint 704 and device operational fingerprint 708. In particular embodiments, the trained neural network may be included in processing system 702. In particular embodiments, the trained neural network may be separate from processing system 702, but not shown in FIG. 7.

Essentially, a network structure and associated weights hold information to identifying one or more computing devices. Group information is stored based on group definitions as learned normal behavior of a group a device belongs to. This could be represented in forms of average and standard deviation, or mode complex models like unsupervised clustering. Device composite fingerprint 710 includes all the features of each of device identity fingerprint 704, device group fingerprint 706, and device operational fingerprint 708. Device composite fingerprint 710 can be used to uniquely identify the corresponding computing device. In some embodiments, device identity fingerprint 704, device group fingerprint 706, device operational fingerprint 708, and device composite fingerprint 710 are stored in a database such as database 102 (not shown in FIG. 7).

Figure 8:
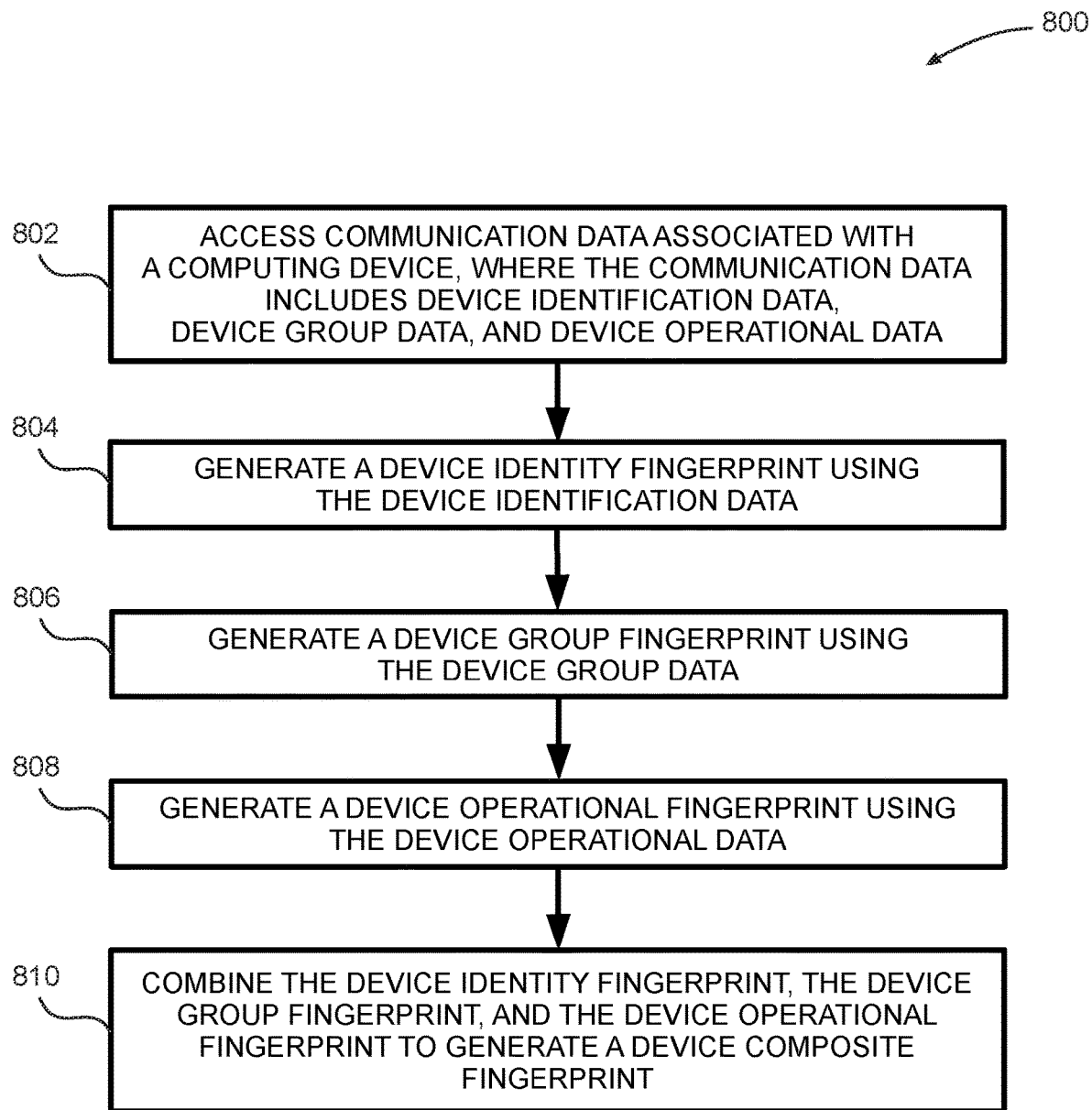
FIG. 8 is a flow diagram depicting an embodiment of a method to generate a device composite fingerprint associated with a computing device.

FIG. 8 is a flow diagram depicting an embodiment of a method 800 to generate a device composite fingerprint associated with a computing device. At 802, communication data associated with a computing device is accessed. In some embodiments, the communication data includes device identification data, device group data, and device operational data, as discussed above. In particular embodiments, the communication data is received by processing system 702 via network gateway 108. At 804, a device identity fingerprint is generated using the device identification data; at 806, a device group fingerprint is generated using the device group data; at 808, a device operational fingerprint is generated using the device operational data. At 810, the device identity fingerprint, device group fingerprint, and device operational fingerprint are combined to generate a device composite fingerprint.

Essentially, a device fingerprint associated with a computing device is generated using both network and radio characteristics. This methodology can be used to generate a device identity fingerprint, a device group fingerprint, and a device operational fingerprint. These fingerprints are then used to determine how to identify existing and new computing devices entering an airspace and associated networks.

A device fingerprint is constructed from RF data associated with a computing device, interface data across multiple spectra where available, decoded protocol data, derived data like OS, type, classification, functionality and services, micro location, ownership and control, data characteristics of each interface, and so on. In some embodiments, each fingerprint is comprised of three fingerprints—a device identity fingerprint, a device group fingerprint, and a device operation fingerprint.

Figure 9:
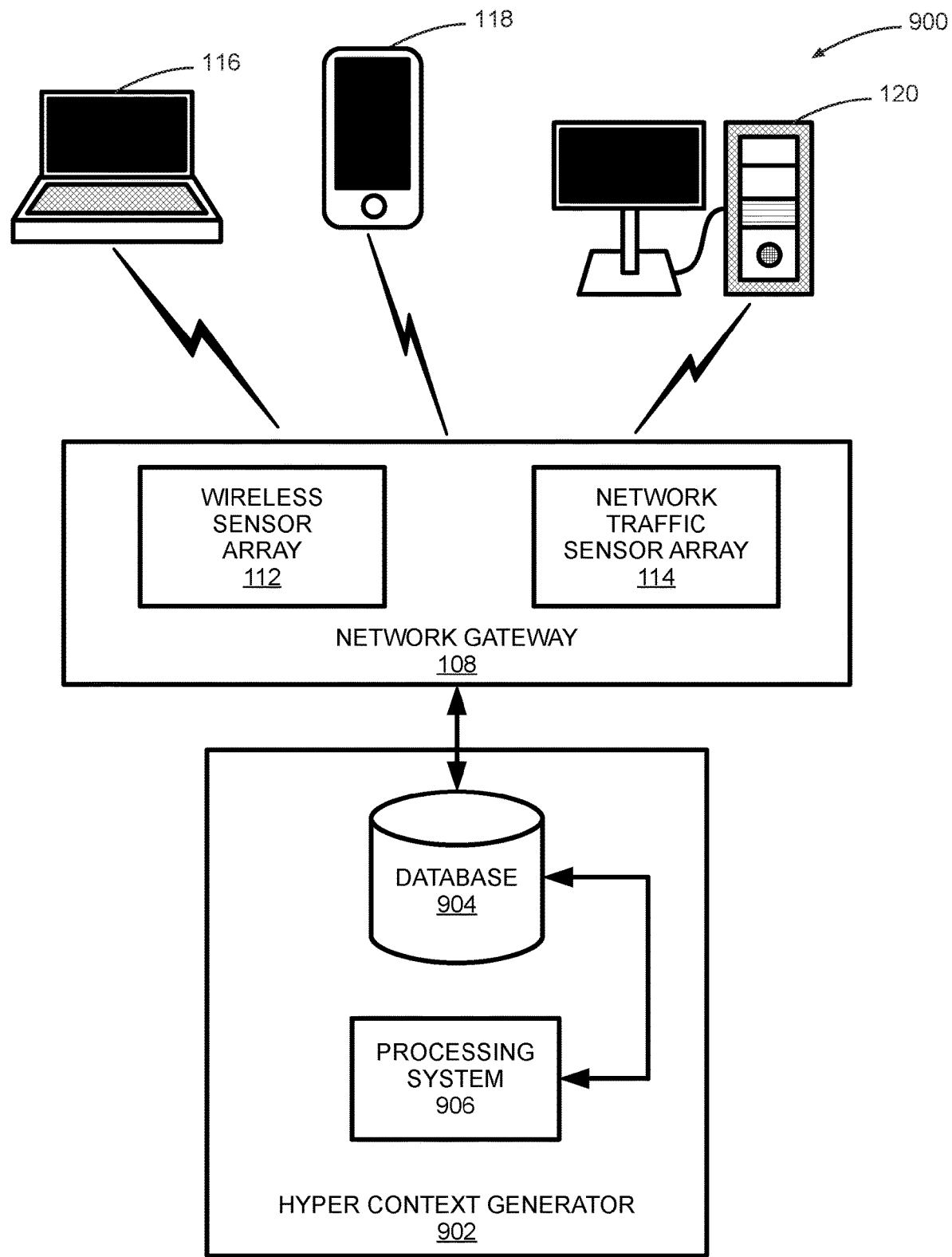
FIG. 9 is a block diagram depicting an embodiment of a hyper context generation system.

FIG. 9 is a block diagram depicting an embodiment of a hyper context generation system 900. In some embodiments, hyper context generation system 900 includes computing device 116, computing device 118, and computing device 120 that function as in temporal data classification system 100. Hyper context generation system 900 also includes network gateway 108, which further includes wireless sensor array 112 and network traffic sensor array 114. In some embodiments, the term "hyper context" is used interchangeably with "Hyper-Context."

In some embodiments, hyper context generation system 900 includes a hyper context generator 902. Hyper context generator 902 includes a database 904 that is communicatively coupled to a processing system 906. In particular embodiments, database 904 is communicatively coupled to network gateway 108, and receives and stores communication data associated with computing device 116 through computing device 120 via network gateway 108. In some embodiments, this communication data is received via a combination of wireless sensor array 112 and network traffic sensor array 114.

In some embodiments, processing system 906 accesses communication data associated with a computing device and stored on database 904, and processes the communication data to generate a hyper context associated with the computing device. In particular embodiments, the hyper context is comprised of a type context, a category context, an operating system context, an ownership context, and a control context. The type context is associated with a type of the computing device; the category context is associated with a category that the computing device falls under; the ownership context is related to information regarding an entity that owns the computing device; and the control context is related to whether the computing device operates automatically, or whether the computing device is controlled by a user. Additional properties which could be included (but not limited to) in a hyper context definition are: microlocation context, physical interfaces context, user context, function context, communication context, application context. In some embodiments, all communication or connectivity interfaces (e.g., WiFi, Bluetooth, Ethernet, and so on) used by a computing device are included in a set of properties associated with the computing device, being defined as a connectivity context. This connectivity context may be included in a hyper context definition associated with the computing device, along with other properties. Details about how the hyper context is generated are provided herein.

Figure 10:
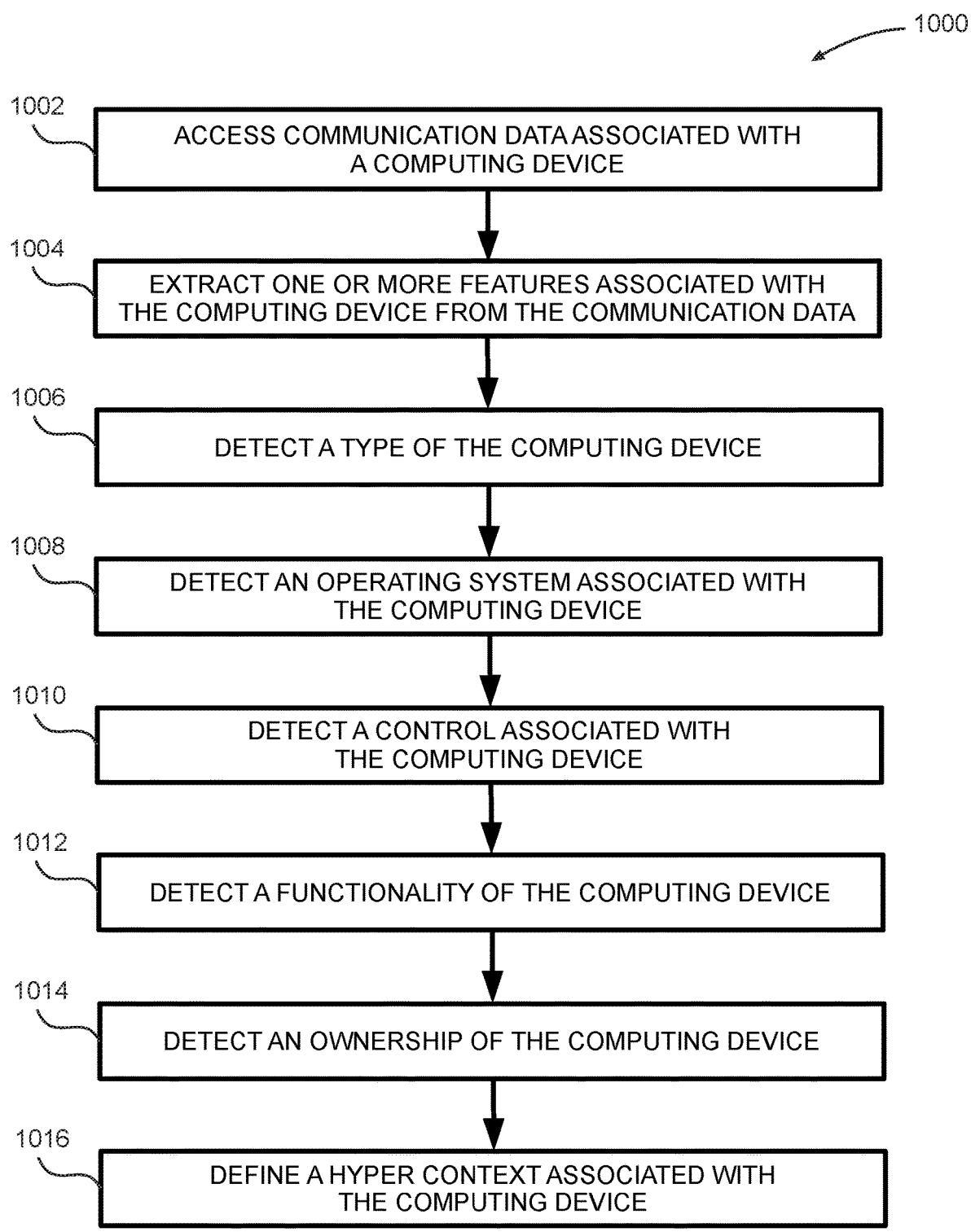
FIG. 10 is a flow diagram depicting an embodiment of a method to generate a hyper context associated with a computing device.

FIG. 10 is a flow diagram depicting an embodiment of a method 1000 to generate a hyper context associated with a computing device. At 1002, communication data associated with a computing device is accessed by, for example, processing system 906, from database 904. In some embodiments, processing system 906 is configured to perform one or more functions associated with method 1000. In some embodiments, database 904 stores data streams associated with the computing device. These data streams are accessed (or read) by processing system 906, and include:
  Packet data
  WiFi radio data (e.g., from a WiFi packet sniffer)
  Bluetooth and BLE data.

At 1004, one or more features associated with the computing device are extracted and saved to, for example database 904. These features include parameters associated with the computing device such as:
  A. Manufacturer
  B. Device host name
  C. Top sites visited
  D. Number of sites visited
  E. Top user-agents used
  F. Network features:
    i. Http, src, dest, direction, ttl, etc
  G. OS signatures:
    i. unique sites visited by specific operating systems, e.g. api.msn.com for Windows, etc.
    ii. Openvas features
    iii. User-agent parsing
    iv. version detection using user-agents
  H. Active hours
    i. hours active based on packet traffic data
    ii. hours seen based on wifi-sniff data
  I. Hourly behavior profiling
    i. average number of bytes sent/received
    ii. Average number of bytes per protocol
  J. Realtime (1-minute) behavior profiling
    i. Average number of connections
    ii. Average number of ports used
    iii. Average number of unique destination IPs
    iv. Average number of packets sent/received
    v. Average number of bytes sent/received Next, at 1006, a type of the computing device is detected. To achieve this, the following operations may be performed by processing system 906:
  a. Run type-detection rules, and generate a weighted matrix of predicted types. In some embodiments, the method runs one or more type detection rules on processing system 906. In particular embodiments, processing system 906 includes machine learning components such as neural networks that enable processing system 906 and method 1006 to implement machine learning-based methods for detecting a type of the computing device.
  b. Run trained machine learning (ML) type-detection model, and add a resulting prediction to the matrix above.
  c. Normalize weights and calculate probability for each type of computing device.
  d. Computing device type is predicted as the type with the highest probability.
  e. Computing device category is determined based on type (lookup table).

At 1008, the method detects an operating system (OS) associated with the computing device. This process involves the following steps:
  a. Run OS-detection rules, and generate a weighted matrix of predicted OSs (include the type predicted above).
  b. Run trained ML OS-detection model, and add the prediction to the matrix above.
  c. Normalize weights and calculate probability for each OS.
  d. Device OS is predicted as the OS with the highest probability.

At 1010, a control associated with the computing device is detected. In some embodiments, the term "control" is used to denote whether the computing device operates automatically, or under a control of a user. To accomplish detecting a control associated with the computing device, the following steps are performed:
  a. Run control-detection rules, and generate a weighted matrix of predicted control (include type, hours active, number of sites visited, etc).
  b. Normalize weights and calculate probability for auto vs user.
  c. Device control is determined as the one with the higher probability.

At 1012, a functionality of the computing device is detected, where the term "functionality" is used to denote how the computing device functions (e.g., audio conferencing, video conferencing, server, hand-held computing device, etc.). In some embodiments, determining a functionality of the computing device includes the following steps:
  a. Run function-detection rules, and generate a weighted prediction matrix (include type of computing device, OS, control predicted in a previous step).
  b. Run a trained ML model, and add the prediction to the matrix generated in a previous step.
  c. Normalize numerical weights associated with the prediction and calculate a probability for each function.
  d. Computing device function is predicted as the function with the highest probability.

At step 1014, the method detects an ownership of the computing device. In some embodiments, ownership of the computing device could include categories such as corporate, employee-owned, visiting, neighbor, and transient. Device ownership classifies a device as one of transient, employee-owned, neighborhood or visiting. The logic to derive classify is as below (all values are parameterized and can be modified to suit a specific application):

The logic involves two factors (a) Average visibility over time (b) Average visibility to wireless sensor array 112 and network traffic sensor array 114 on a daily basis (hereinafter, "sensors").

Employee devices (i.e., computing devices owned by employees at an institution) are most frequently seen devices both over time and by visibility to more than two sensors. From a behavioral perspective, employee devices may enter or may not enter corporate networks, guest networks or other networks.

Visitor devices (i.e., computing devices owned by visitors to an institution) are less frequently seen devices compared to employees. These devices typically have an average visibility of anything greater than a half hour to more hours, either once or repeatedly, seen for a few days only. Visitor devices will be seen by more than two sensors. From a behavioral perspective, visitor devices may enter or may not enter a corporate network or a guest network, or other networks. If a visitor device is seen to enter a corporate network, then this might be an anomaly and a cause for concern from a network safety standpoint.

Transient devices are computing devices that are seen less than a half hour at a time, and they are seen very sporadically. These devices may be seen by two or less sensors only at any given point of time; if seen by more than two sensors, the measured signal strength at the second sensor, the third sensor, or any subsequent sensor will be low. From a behavioral perspective, transient devices may enter or may not enter a corporate network or a guest network or other networks. In certain instances, however, if a transient device is seen to enter a corporate network, then this might be an anomaly and a cause for concern from a network safety standpoint.

Neighboring devices are computing devices that are connected to other access points (APs) exclusively and have never connected to an AP belonging to a network associated with the institution. These computing devices will be seen by either two or less sensors or if seen by more than the signal strengths will be low. Examples of neighboring devices are devices located in adjacent buildings or in other institutions at a different location in the building from the present institution.

At 1016, the method defines a hyper context associated with the computing device. Essentially, hyper context-aware learning involves learning about a context of a device and being able to associate a device with different groups based on a time of day, one or more communication protocols, content, type ownership, control, manufacturer, function, operating system, and other parameters.

Figure 11:
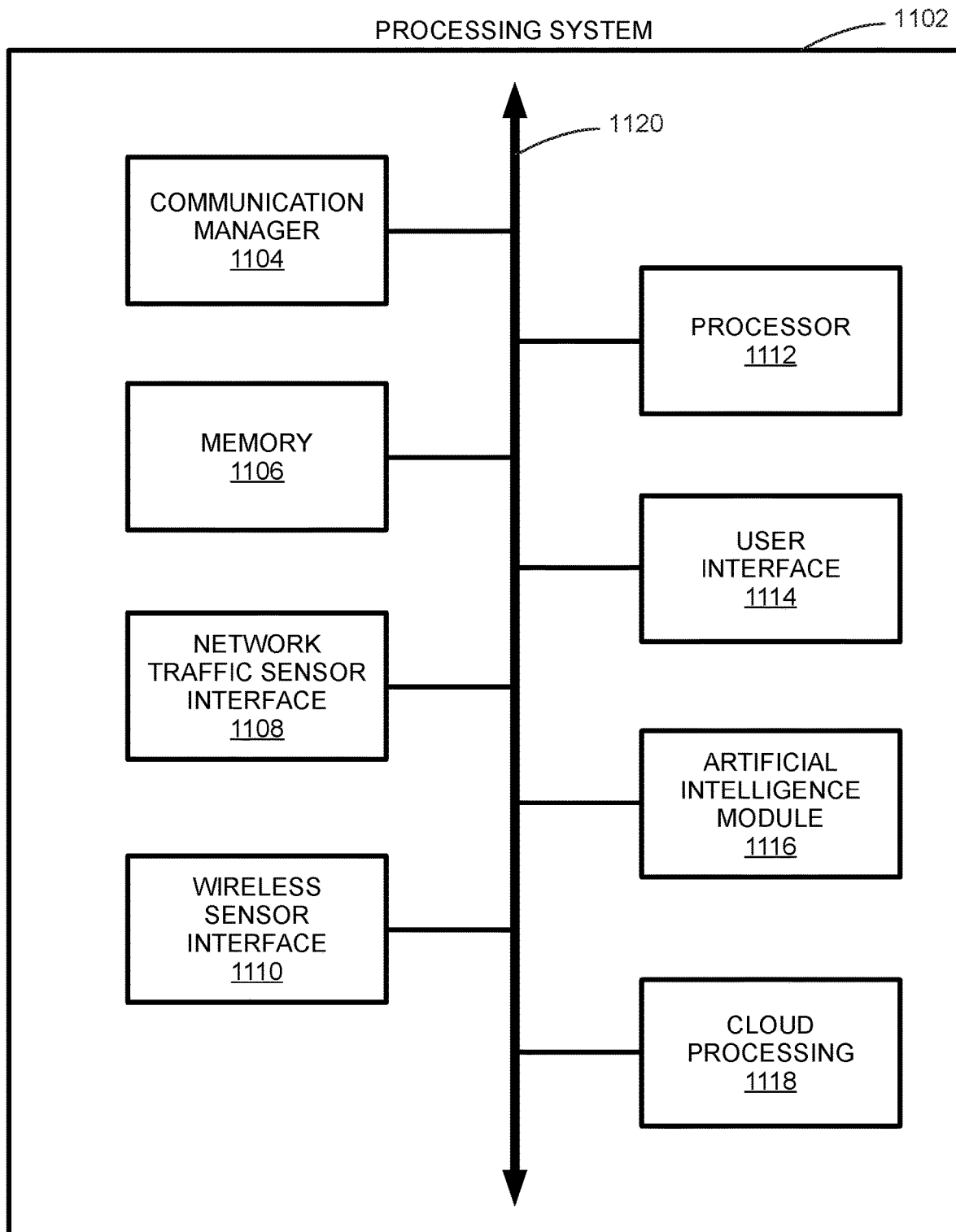
FIG. 11 is a block diagram depicting an embodiment of a processing system.

FIG. 11 is a block diagram depicting an embodiment of a processing system 1102. Processing system 1102 may be used to enable processing functions associated with the different embodiments presented herein. For example, processing system 1102 may perform functions associated with processing system 104, processing system 504, processing system 702, and processing system 906.

In some embodiments, processing system 1102 includes a communication manager 1104 that is configured to manage communication protocols and associated communication with external peripheral devices as well as communication with other components in processing system 1102. For example, communication manager 1104 may be responsible for generating and maintaining a communication interface between processing system 702 and network gateway 108.

Some embodiments of processing system 1102 include a memory 1106 that is configured to store data associated with the different computing device fingerprinting applications described herein. In particular embodiments, memory 1106 includes both long-term memory and short-term memory. Memory 1106 may be comprised of any combination of hard disk drives, flash memory, random access memory, read-only memory, solid state drives, and other memory components.

In some embodiments, processing system 1102 includes a network traffic sensor interface 1108 that enables processing system 1102 to interface and communicate with network traffic sensor array 114. In some embodiments, processing system 1102 includes a wireless sensor interface 1110 that allows processing system to interface and communicate with wireless sensor array 112.

A processor 1112 included in some embodiments of processing system 1102 is configured to perform functions that may include generalized processing functions, arithmetic functions, and so on. Processor 1112 is configured to process information associated with the systems and methods described herein.

In some embodiments, processing system 1102 includes a user interface 1114 that allows a user to interact with embodiments of the systems described herein. User interface 1114 may include any combination of user interface devices such as a keyboard, a mouse, a trackball, one or more visual display monitors, touch screens, incandescent lamps, LED lamps, audio speakers, buzzers, microphones, push buttons, toggle switches, and so on.

Some embodiments of processing system 1102 include an artificial intelligence module 1116 that is configure to perform operations related to artificial intelligence, machine learning, neural network functions, and other artificial intelligence related operations presented herein.

Some embodiments of the systems and methods described herein may include cloud computing, where certain functions associated with computing device fingerprint definition are computed on cloud servers, including detecting and combining together all interfaces (e.g. MAC addresses) belonging to a specific computing device. For example, a laptop can have 3 different MAC addresses, one for a WiFi interface, one for a Bluetooth interface, and one for an Ethernet interface. To accomplish this, some embodiments of processing system 1102 include a cloud processing 1118.

A data bus 1120 communicatively couples the different components of processing system 1102, and allows data and communication messages to be exchanged between these different components.

Figure 12:
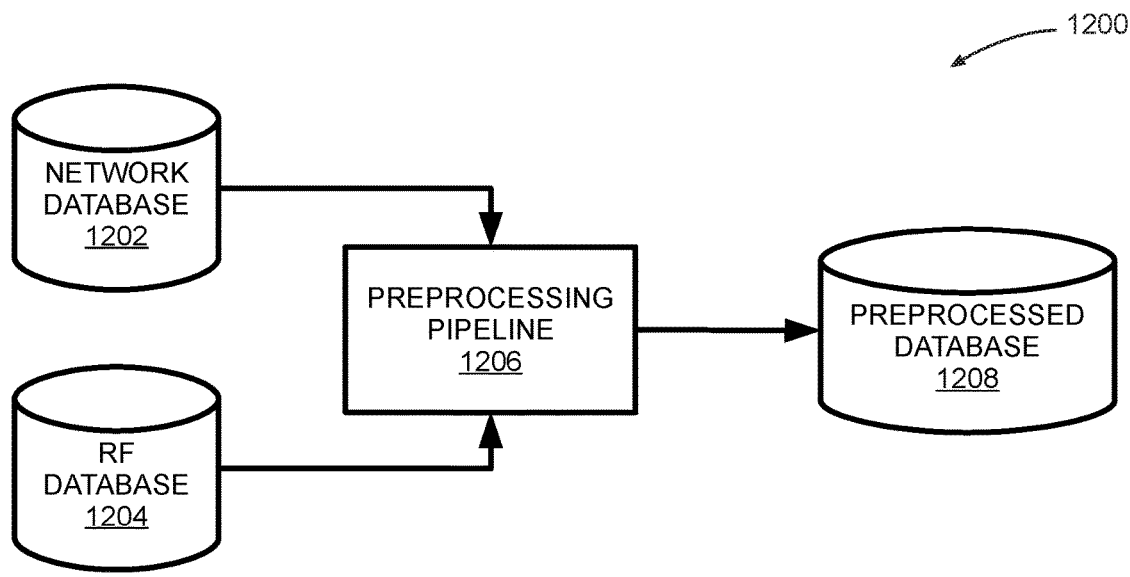
FIG. 12 is a block diagram depicting an embodiment of a preprocessing system.

FIG. 12 is a block diagram depicting an embodiment of a preprocessing system 1200 that is configured to preprocess raw data for training an artificial intelligence system. In some embodiments, a preprocessing pipeline 1206 reads in network data and RF data from a network database 1202 and an RF database 1204 respectively. In some embodiments, the network data is saved to network database 1202 via network traffic sensor array 114, while the RF data is saved to RF database 1204 by wireless sensor array 112. Preprocessing pipeline 1206 processes the network data and RF data and generates preprocessed data that is stored in a preprocessed database 1208. In some embodiments, preprocessing pipeline 1206 implements the following algorithm:

1. get historical data (packet, WiFi, SB, BLE, etc):
   a. select features from packet data:
      i. base64_payload length,
      ii. character distribution
      iii. event type (http, tls, etc),
      iv. tls.sni,
      v. http.hostname,
      vi. http.http_content_type,
      vii. http.http_user_agent,
      viii. source city
      ix. destination city
      x. direction
   b. select features from WiFi-sniff
      i. number of packets, ii. power,
iii. channel,
iv. probe_data
v. type
c. select BT/BLE features
2. windowing (e.g. 5-min aggregation):
a. base64_payload_lenbth: total 5-min payload
b. character distribution: average bucketized [0,2,4,6,>6]
c. tls.sni: list of strings
d. http.hostname: list of strings
3. embedding
a. Word2vec: unsupervised algorithm (converts words in a text to a vector, preserving the semantic relationship between words. (embedding dim=10))
b. Averaging vectors
4. merge
a. (Mac, window, day)→[packet features],[wifi-sniff features]
5. normalization
a. (zero-mean, unit-std)
6. combining by day $$(\text{mac, day}) \to \begin{pmatrix} \begin{bmatrix} \text{features1} \\ \text{features2} \\ \vdots \\ \text{features288} \end{bmatrix} \end{pmatrix}$$

where row i is the feature vector corresponding to the i-th window.
final labeled feature-matrix example:
(
('f:28:19:c1:9d:57', '20180512')→
[[2.24221389, −1.71858439, 9.27867146, . . . , −1.13205749, 3.43314762, 1.88349995],
[2.24221389, −1.68388034, 9.27867146, . . . , −0.34448867, 0.65424459, −0.73088332],
[2.24221389, −1.64917629, 9.27867146, . . . , −0.34448867, 0.65424459, −0.73088332],
. . . ,
[2.24221389, 1.50889203, 9.27867146, . . . , −1.07846278, 3.41175207, 1.74836695],
[2.24221389, 1.54359608, 9.27867146, . . . , −1.22088262, 1.83550511, 0.79017506],
[2.24221389, 1.57830012, 9.27867146, . . . , −1.02486807, 3.39035652, 1.61323395]])

As presented in the algorithm above, preprocessing system 1200 reads in historical data such as packet data, WiFi data, Bluetooth data, BLE data, and so on, that is stored in network database 1202 and RF database 1204. Windowing functions are performed on pre-selected temporal data lengths (e.g., 5-minute data windows). Embedding functions convert the data into feature vectors that are averaged. A merging function merges packet features and WiFi sniff features, and a normalization function processes the feature vectors so that they are zero-mean, and have a unit standard deviation. Finally, the different feature vectors are combined to form a matrix, an example of which is presented above. As seen above, the matrix has a MAC address associated with a computing device and a date associated with the measurements on the left-hand side. The matrix is associated with this combination of MAC address and date. Preprocessed database 1208 contains matrix data such as the example presented above. In some embodiments, when neural networks are used to process data, this matrix is interpreted as an image (i.e., a device behavior image) by the neural networks. In particular embodiments, preprocessed database 1208 is implemented using Amazon S3 cloud data storage.

Figure 13:
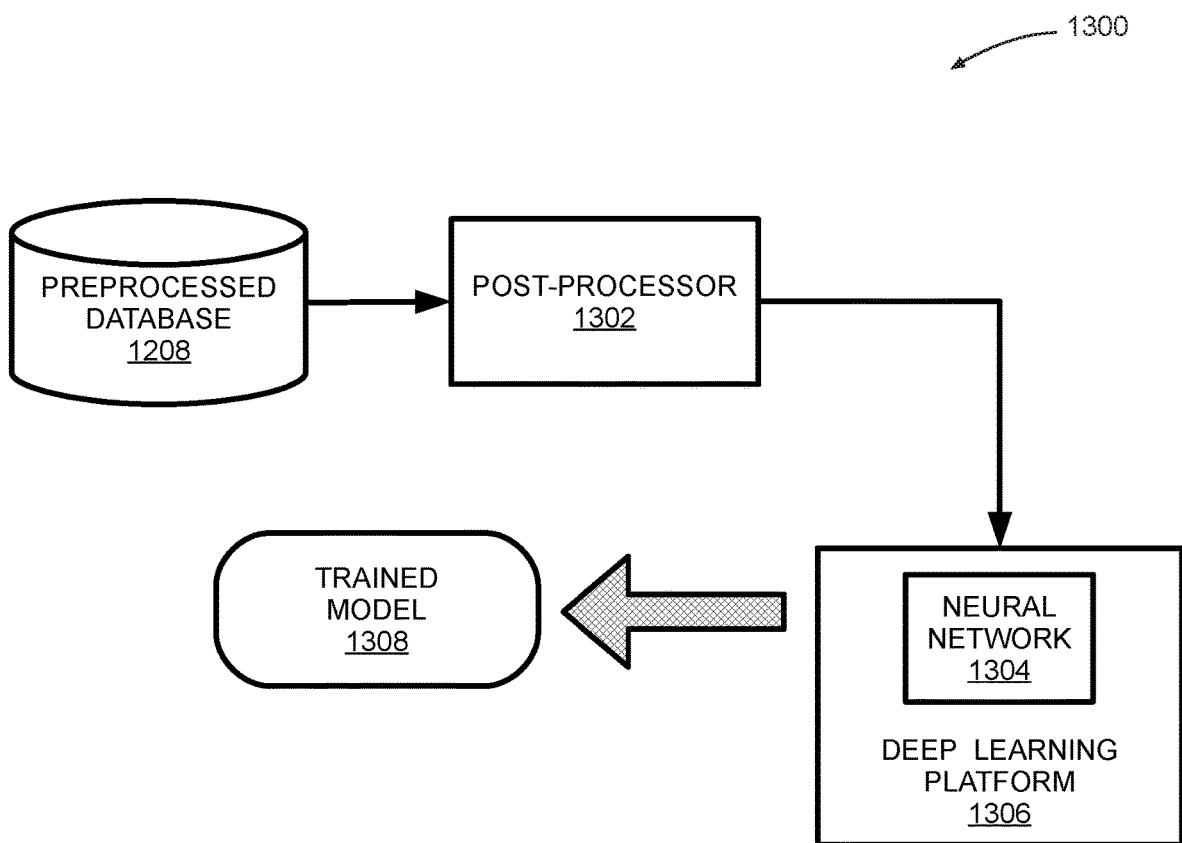
FIG. 13 is a block diagram depicting an embodiment of a training system.

FIG. 13 is a block diagram depicting an embodiment of a training system 1300 that is configured to process data from preprocessed database 1208 and generate a trained model 1308. In some embodiments, preprocessed database 1208 is an Amazon S3 cloud data storage mounted to a Ubuntu Linux operating system.

In embodiments, data from preprocessed database 1208 is received by a post-processor 1302 that performs the following operations on the data:
Filtering,
Reading and conversion associated JSON data into a sparse matrix,
Converting the data to a tensor format that is readable by a program such as TensorFlow, and
Encoding MAC addresses.

An output from post-processor 1302 is received by a deep learning platform 1306. Some embodiments of deep learning platform 1306 are implemented using a combination of Keras and TensorFlow, and include a neural network 1304. In particular embodiments, neural network 1304 is a 24-layer convolutional neural network (CNN). Other embodiments may use CNNs with a different layer count.

In some embodiments Keras is used to implement a high-level API, while TensorFlow is used as a backend environment in deep learning platform 1306. Some embodiments of deep learning platform 1306 use RMSprop as an optimizer, categorical cross entropy as a loss function, and categorical accuracy as an accuracy metric. Deep learning platform produces 1306 a trained model 1308 as an output. Trained model 1308 is used as a basis (reference) for subsequent data processing operations—training system 1300 trains a deep neural network model to predict a MAC address from a feature matrix created in a preprocessing step by preprocessing system 1200.

Figure 14:
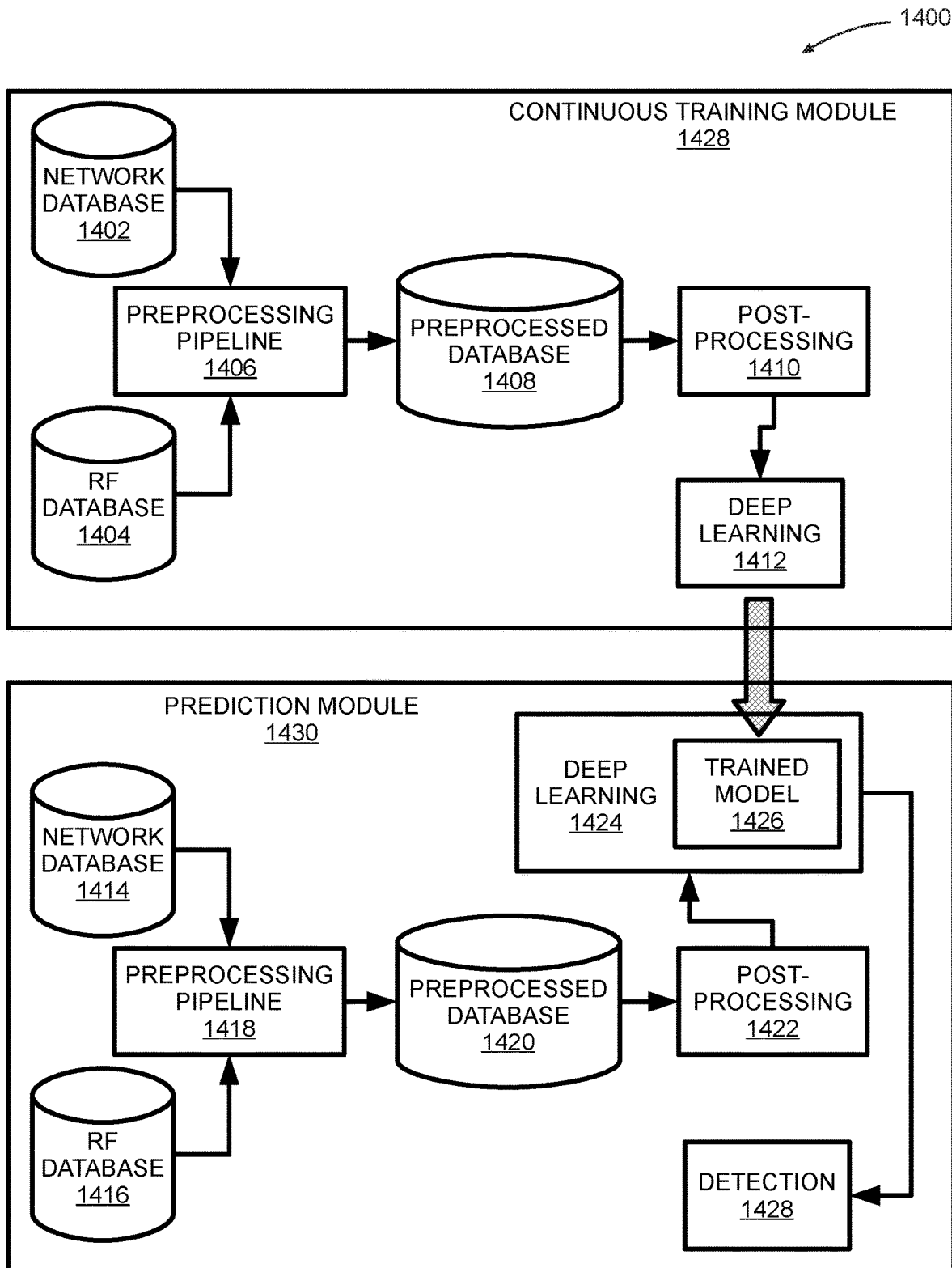
FIG. 14 is a block diagram depicting an embodiment of a deep learning and classification system.

FIG. 14 is a block diagram depicting an embodiment of a deep learning and classification system 1400. In some embodiments, deep learning and classification system 1400 is configured to:
Make predictions using new data, and
Add new data (from safe computing devices) to an associated training set.

Deep learning and classification system 1400 is comprised of a continuous training module 1428 and a prediction module 1430. Continuous training module 1428 is configured to process historical communication data associated with one or more computing devices communicating over the network, and train and update associated trained models on an ongoing basis. Prediction module 1430 is configured to perform a detection operation on current communication data.

In some embodiments, continuous training module 1428 operates as a combination of preprocessing system 1200 and training system 1300. Specifically, continuous training module 1428 includes a network database 1402, an RF database 1404, a preprocessing pipeline 1406, a preprocessed database 1408, a post-processing 1410, and a deep learning 1412 that perform functions similar to network database 1202, RF database 1204 preprocessing pipeline 1206, preprocessed database 1208, post-processor 1302, and deep learning platform 1306 respectively. Continuous training model 1428 generates a trained model 1426 similar to trained model 1308. In some embodiments, continuous training module 1428 generates and updates trained model 1426 on an ongoing (i.e., continuous) basis.

In some embodiments, prediction module 1430 operates in a manner similar to that of continuous training module 1428, with the key difference being that prediction module 1428 operates on historical communication data, while prediction module 1430 operates on current communication data. In some embodiments, current communication data is defined as communication data associated with a communication device that is associated with a current time instant, rather than a historical (i.e., past) period of time.

In some embodiments, prediction module 1430 includes a network database 1414, an RF database 1416, a preprocessing pipeline 1418, a preprocessed database 1420, a postprocessing 1422, and a deep learning 1424 that perform functions similar to network database 1202, RF database 1204 preprocessing pipeline 1206, preprocessed database 1208, post-processor 1302, and deep learning platform 1306 respectively. In some embodiments, deep learning 1424 includes trained model 1426; deep learning 1412 updates trained model 1426 that is contained within deep learning 1424. In some embodiments, deep learning 1424 processes current communication data, and generates a detection 1428 using trained model 1426 as a reference. In some embodiments, detection 1428 is associated with a device fingerprint or a MAC address prediction.

Figure 15:
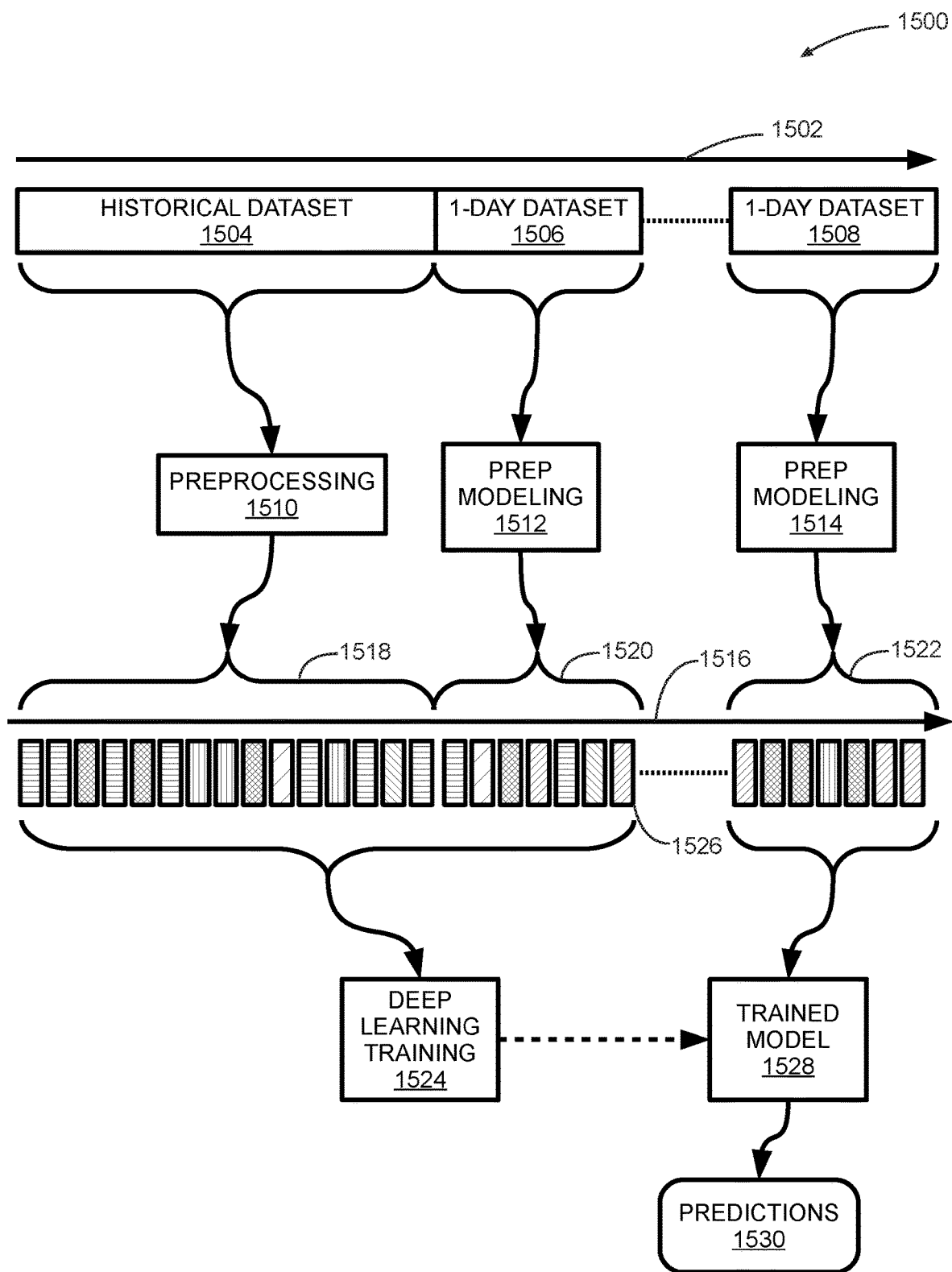
FIG. 15 is a process flow diagram depicting an embodiment of a workflow.

FIG. 15 is a process flow diagram depicting an embodiment of a workflow 1500. In some embodiments, workflow 1500 is associated with a continuous learning and classification process, and includes a temporal timeline 1502 that indicates a time frame or a specific length of time (e.g., 6 months, 1 week, or 1 day). In some embodiments workflow 1500 is implemented by deep learning and classification system 1400.

The continuous learning and classification process uses a historical dataset 1504. In some embodiments, historical dataset 1504 is of a temporal duration of 6 months. In other embodiments, historical dataset 1504 is of a temporal duration of 12 months, or some other temporal duration. In embodiments, historical dataset 1504 is processed monthly, by a preprocessing 1510. In particular embodiments, preprocessing 1510 functions similar to preprocessing pipeline 1406, and generates a sequence of matrices, referred to as an image ensemble 1518. Image ensemble 1518 is a collection (i.e., a temporal sequence) of matrices, with each matrix being interpreted as an image by a deep learning training 1524. In some embodiments, each matrix in is similar to the matrix generated by preprocessing pipeline 1206.

In some embodiments, a 1-day dataset 1506 is processed by a prep modeling 1512 that generates an image ensemble 1520, where image ensemble 1520 is a set of matrices, and where each matrix is similar to the matrix generated by preprocessing pipeline 1206. An image ensemble timeline 1516 is associated with a time-series generated by the various image ensembles such as image ensemble 1518 and image ensemble 1520. In some embodiments, image ensemble timeline 1516 runs concurrently with temporal timeline 1502. An image 1526 is an example of a representative image interpretation of a matrix.

Collectively, image ensemble 1518 and image ensemble 1520 are generated from historical data associated with a computing device (i.e., historical dataset 1504 and 1-day dataset 1506 respectively), and are collectively processed by deep learning training 1524 to create a trained model 1528 that is similar to trained model 1426. In some embodiments, this processing by deep learning training 1524 is performed daily. Some embodiments may process additional historical data on an ongoing basis to create and then update trained model 1528.

In some embodiments, a 1-day dataset 1508 comprises a current dataset that is read by a prep modeling 1514. Prep modeling 1514 generates an image ensemble 1522 that is processed by trained model 1528 to generate a predictions 1530. In some embodiments, predictions 1530 is generated daily, and includes one or more predictions associated with one or more computing devices, such as MAC addresses, fingerprints, hyper contexts, and so on. In particular embodiments, image ensemble 1522 is generated daily by prep modeling 1514 on a daily basis.

In some embodiments, deep learning and classification system 1400 implements workflow 1500. Collectively, continuous training module 1428 and prediction module 1430 implement a continuous learning and classification algorithm. This continuous learning and classification algorithm can be summarized as follows:

1. Create unsupervised preprocessing models (e.g., preprocessing 1510) on historical data on a first periodic basis (e.g., repeat every month).
2. Train deep Neural Net models (e.g., deep learning 1412, deep learning training 1524) using preprocessed historical data on a second periodic basis (e.g., repeat weekly).
3. Continuously preprocess new data as the new data is received from the stream using models created in step 1 (continuous preprocessing by prediction module 1430, prep modeling 1512).
4. Use the trained Neural Net models to predict Mac addresses from new preprocessed data created in step 3 continuously (continuous processing by deep learning 1424, prep modeling 1514).
5. Add new data to a training set for future training (exclude abnormal or hostile device data). (Update trained model 1426 on an ongoing basis by continuous training module 1428 or functioning of prep modeling 1512.)

Figure 16:
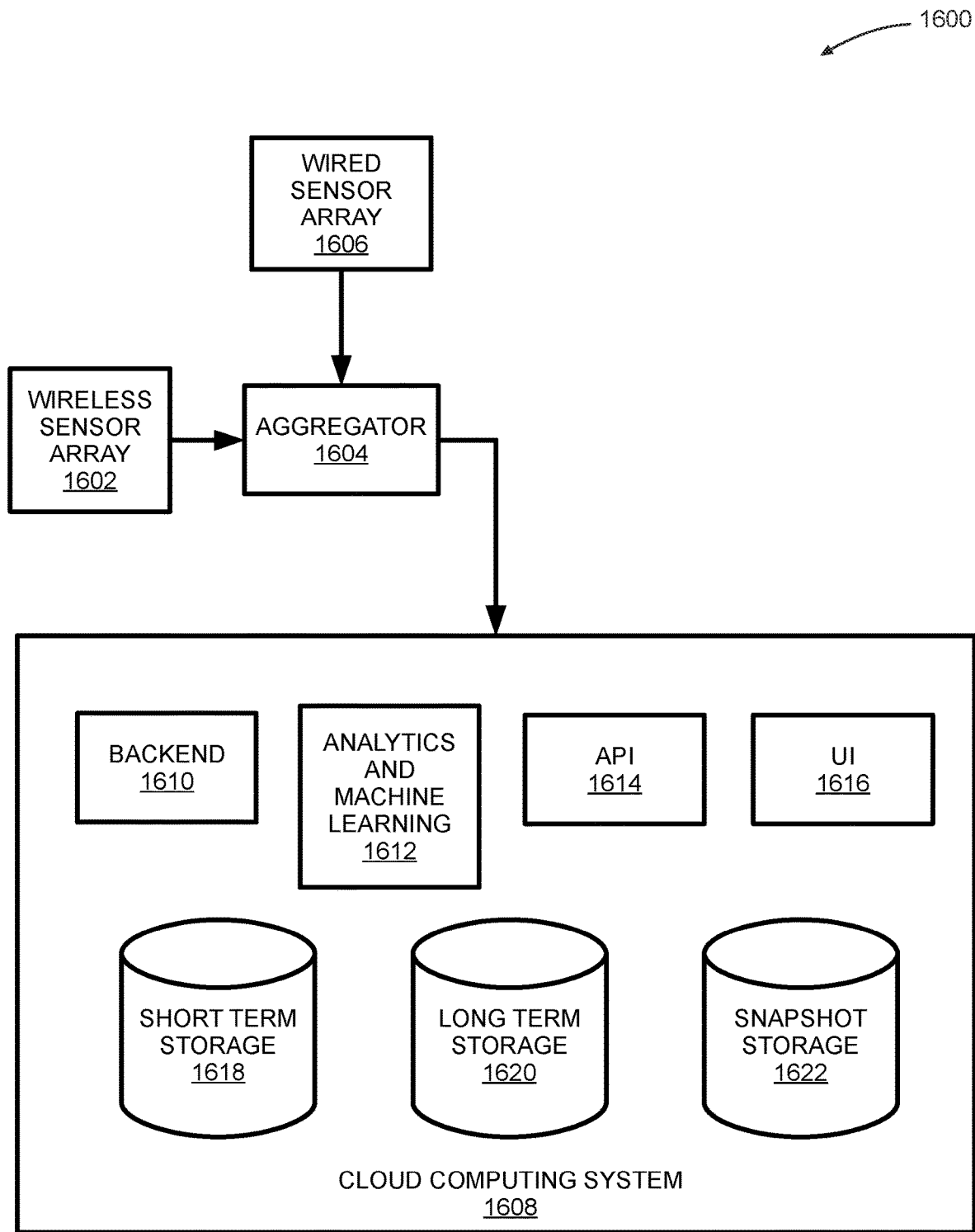
FIG. 16 is a block diagram depicting an embodiment of a high level architecture.

FIG. 16 is a block diagram depicting an embodiment of a high level architecture 1600. In some embodiments, high level architecture 1600 includes a wireless sensor array 1602 and a wired sensor array 1604 that function similar to wireless sensor array 112 and network traffic sensor array 114 respectively. Data outputs from wireless sensor array 1602 and wired sensor array 1606 are received by an aggregator 1604 that is configured to aggregate the outputs from wireless sensor array 1602 and wired sensor array 1606, and transmit the aggregated outputs to a cloud computing system 1608.

In some embodiments, cloud computing system 1608 is configured to implement the systems and methods described herein (i.e. device fingerprint generation, reverse-prediction of a MAC address, composite device fingerprint generation, and hyper context generation). In some embodiments, cloud computing system 1608 includes a short-term storage 1618 that is configured to store short-term data received from one or more computing devices; a long-term storage 1620 that is configured to store long-term data received from one or more computing devices; and a snapshot storage 1622 that is configured to store data snapshots associated with one or more computing devices.

In some embodiments, cloud computing system 1608 includes a backend 1610 that is responsible for data manipulation and other computing operations. Particular embodiments of cloud computing system 1608 include an analytics and machine learning 1612 that is configured to implement artificial intelligence and machine learning aspects of the systems and methods described herein. An API 1614 included in some embodiments of cloud computing system 1608 is an application programming interface for a user; a UI 1616 is a user interface that allows a user to interact with some embodiments of cloud computing system 1608.

Figure 17:
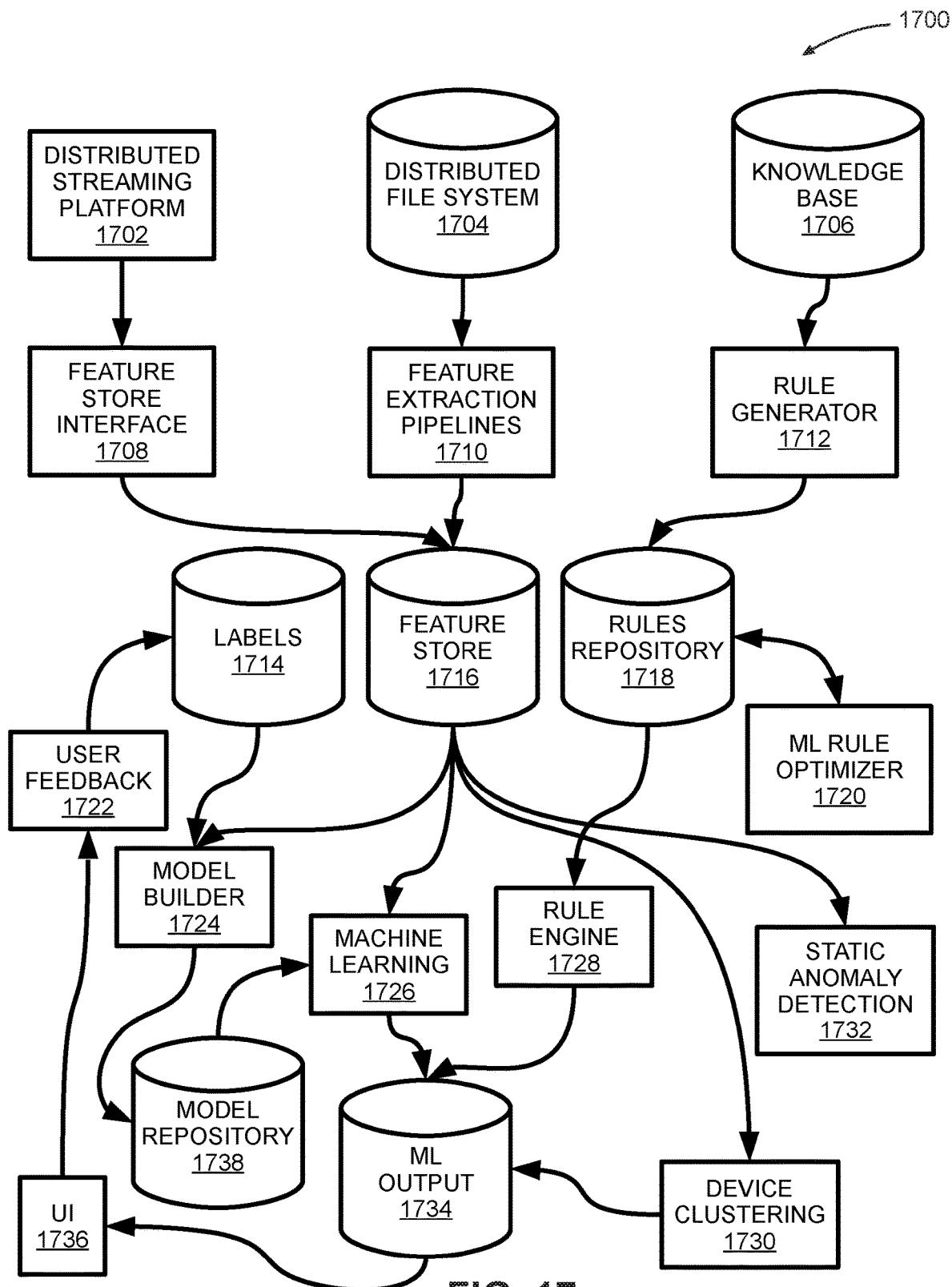
FIG. 17 is a block diagram depicting an embodiment of a hyper context architecture.

FIG. 17 is a block diagram depicting an embodiment of a hyper context architecture 1700. In some embodiments, hyper context architecture 1700 is configured to generate a hyper context associated with a computing device. In some embodiments, hyper context architecture 1700 includes a distributed streaming platform 1702 that implements a real-time data pipeline. In some embodiments, distributed streaming platform 1702 may be implemented using a Kafka platform. Outputs from distributed streaming platform 1702 are received by a feature store interface 1708 that extracts one or more features from the received data, and transmits these features to a feature store 1716. In some embodiments, feature store 1716 is a database configured to store any received features from different components of hyper context architecture 1700. In particular embodiments, feature store interface 1708 is a Kafka feature store interface.

In some embodiments, a distributed file system 1704 stores communication data associated with one or more computing devices. A feature extraction pipelines 1710 receives this communication data and extracts one or more features associated with the computing devices from the data, as described herein. These extracted features are output by feature extraction pipelines 1710 to feature store 1716. A knowledge base 1706 included in some embodiments of hyper context architecture 1700 stores, for example, data, rules, learned information, and other data associated with artificial intelligence or machine learning algorithms. An output from knowledge base 1706 is received by a rule generator 1712 that is configured to generate one or more rules associated with any machine learning algorithm or artificial intelligence algorithm running on hyper context architecture 1700. An output from rule generator 1712 is received and stored by a rules repository 1718. In some embodiments, rules repository 1718 is substantially optimized by an ML rule optimizer 1720 that is configured to apply optimization techniques to any machine learning rules stored in rules repository 1718.

In some embodiments, hyper context architecture 1700 includes a labels 1714 that stores one or more user-defined labels for communication data associated with one or more computing devices. Outputs from labels 1714 and feature store 1716 are received by a model builder 1724 that generates one or more machine learning models that are received by and stored in a model repository 1738. A machine learning 1726 is configured to receive one or more features from feature store 1716 and one or more machine learning models from model repository 1738, to produce machine learning data that is stored in an ML output 1734. In some embodiments, outputs from rules repository 1718 are processed by a rule engine 1728 that generates one or more rules associated with the associated machine learning algorithms, and outputs these rules to ML output 1734. Together, machine learning 1726 and rule engine 1728 output data such as predicted computing device types, OS, category, control and so on, to ML output 1734.

In some embodiments, outputs from feature store 1716 are received and processed by a static anomaly detection 1732 that is configured to analyze features stored in feature store 1716 and determine a presence of one or more anomalies in the features. For example, static anomaly detection 1732 may detect a presence of one or more abnormal devices on the network which could potentially be hostile. In some embodiments, outputs from feature store 1716 are received by a device clustering 1730 that is configured to find clusters of devices which essentially means detecting groups of devices that behave similarly. This function is also used in group identity establishment. Outputs from device clustering 1730 are stored in ML output 1734. In some embodiments, ML output 1734 includes device hyper contexts for one or more computing devices.

In some embodiments, outputs from ML output 1734 are displayed to a user on a UI 1736, that is a user interface. The user provides user feedback via a user feedback 1722, that updates data in labels 1714.

Although the present disclosure is described in terms of certain example embodiments, other embodiments will be apparent to those of ordinary skill in the art, given the benefit of this disclosure, including embodiments that do not provide all of the benefits and features set forth herein, which are also within the scope of this disclosure. It is to be understood that other embodiments may be utilized, without departing from the scope of the present disclosure.

What is claimed is:

1. A method to reverse-predict a MAC address associated with a computing device, the method comprising:
    accessing first temporal communication data associated with the computing device for a first time interval;
    converting the first temporal communication data into a first image, wherein the converting comprises:
        performing a windowing operation on the first temporal communication data;
        embedding the windowed first temporal communication data into a first vector;
        merging first information associated with the first vector, wherein the first information includes packet features and WiFi sniff features;
        normalizing the first vector;
        combining the first vector with a further plurality of additional vectors to generate a first data matrix; and
        interpreting the first data matrix as a first image;
    accessing second temporal communication data associated with the computing device for a second time interval;
    generating a second data matrix from the second temporal communication data;
    interpreting the second data matrix as a second image;
    analyzing an image ensemble, including the first image and the second image, using a neural network, each image in the image ensemble converted from temporal communication data associated with the computing device;
    learning, by the neural network, a temporal pattern associated with the image ensemble;
    accessing current temporal communication data associated with the computing device;
    generating a current data matrix from the current temporal communication data;
    interpreting the current data matrix as a current image;
    comparing, by a processing system, the current image with the temporal pattern, wherein the comparing includes processing network communication data included in the current image and the temporal pattern, and wherein the network communication data is associated with the computing device; and
    reverse-predicting a MAC address associated with the computing device responsive to the comparison.

2. The method of claim 1, wherein the neural network is a convolutional neural network.

3. The method of claim 1, further comprising:
    comparing the MAC address with a plurality of reference MAC addresses; and
    generating an alert if the MAC address is not recognized.

4. The method of claim 1, wherein the temporal communication data includes data associated with a wireless communication protocol or a wired communication protocol.

5. The method of claim 4, wherein the wireless communication protocol is any of WiFi, Bluetooth, Bluetooth Low Energy, Zigbee, Long-Term Evolution, mobile network data, ultrasound, or an optical communication protocol.

6. The method of claim 4, wherein the wired communication protocol is any of Ethernet, SCADA, USB, IoT, or an arbitrary network protocol.

7. The method of claim 1, further comprising averaging the first vector.

8. The method of claim 1, wherein the temporal communication data includes packet data, WiFi data, Bluetooth data or Bluetooth Low Energy data.

9. The method of claim 1, wherein the normalization comprises:
processing the vector to generate a zero-mean vector; and
processing the zero-mean vector to generate a vector with a unit standard deviation.

10. The method of claim 1, wherein the windowing operation is associated with a 5-minute temporal data window.

11. An apparatus to reverse-predict a MAC address associated with a computing device, the apparatus comprising:
a database configured to store temporal communication data for a plurality of time intervals associated with the computing device;
a processing system communicatively coupled to the database, wherein the processing system accesses first temporal communication data associated with the computing device for a first time interval, wherein the processing system performs a windowing operation on the first temporal communication data, wherein the processing system embeds the windowed first temporal communication data into a first vector, wherein the processing system merges first information associated with the first vector, wherein the first information includes packet features and WiFi sniff features, wherein the processing system normalizes the first vector, wherein the processing system combines the first vector and a further plurality of additional vectors to generate a first data matrix, wherein the processing system interprets the first data matrix as a first image, wherein the processing system stores the first image in the database, wherein the processing system accesses second temporal communication data associated with the computing device for a second time interval, wherein the processing system generates a second data matrix from the second temporal communication data, wherein the processing system interprets the second data matrix as a second image, wherein a neural network associated with the processing system analyzes an image ensemble that includes the first image and the second image, wherein each image in the image ensemble is converted from temporal communication data associated with the computing device, wherein the neural network learns a temporal pattern associated with the image ensemble, wherein the processing system accesses current temporal communication data associated with the computing device, wherein the processing system generates a current data matrix from the current temporal communication data, wherein the processing system interprets the current data matrix as a current image, wherein the neural network compares the current image with the temporal pattern, wherein the comparing includes processing network communication data included in the current image and the temporal pattern, wherein the network communication data is associated with the computing device, and wherein the neural network reverse-predicts a MAC address associated with the computing device.

12. The apparatus of claim 11, wherein the neural network is a convolutional neural network.

13. The apparatus of claim 11, wherein the temporal communication data includes data associated with a wireless communication protocol or a wired communication protocol.

14. The apparatus of claim 13, wherein the wireless communication protocol is any of WiFi, Bluetooth, Bluetooth Low Energy, Zigbee, Long-Term Evolution, mobile network data, ultrasound, or an optical communication protocol.

15. The apparatus of claim 13, wherein the wired communication protocol is any of Ethernet, SCADA, USB, IoT, or an arbitrary network protocol.

16. The apparatus of claim 11, wherein the processing system averages the first vector.

17. The apparatus of claim 11, wherein the windowing operation is associated with a 5-minute temporal data window.

18. The apparatus of claim 11, further comprising a network gateway, wherein the network gateway receives the temporal communication data from the computing device, and wherein the network gateway stores the temporal communication data on the database.

19. The apparatus of claim 18, wherein the network gateway includes a wireless sensor array and a network traffic sensor array.

20. The apparatus of claim 19, wherein the wireless sensor array includes a WiFi packet sniffer and a Bluetooth packet sniffer.

* * * * *